(12) United States Patent
Jeon

(10) Patent No.: US 10,369,978 B2
(45) Date of Patent: Aug. 6, 2019

(54) ELECTRIC BRAKE SYSTEM

(71) Applicant: MANDO CORPORATION, Gyeonggi-do (KR)

(72) Inventor: In-Wook Jeon, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 173 days.

(21) Appl. No.: 15/261,797

(22) Filed: Sep. 9, 2016

(65) Prior Publication Data

US 2017/0072927 A1    Mar. 16, 2017

(30) Foreign Application Priority Data

Sep. 11, 2015  (KR) .................. 10-2015-0128852

(51) Int. Cl.
*B60T 7/04* (2006.01)
*B60T 8/34* (2006.01)
(Continued)

(52) U.S. Cl.
CPC .............. *B60T 11/20* (2013.01); *B60T 7/042* (2013.01); *B60T 8/4081* (2013.01);
(Continued)

(58) Field of Classification Search
CPC ...... B60T 8/17554; B60T 8/17; B60T 8/4018; B60T 8/4081; B60T 8/348; B60T 7/042;
(Continued)

(56) References Cited

U.S. PATENT DOCUMENTS

| 2002/0084691 A1* | 7/2002 | Isono | B60T 8/4081 |
| | | | 303/10 |
| 2006/0202551 A1* | 9/2006 | Gottwick | B60T 8/4081 |
| | | | 303/116.1 |

(Continued)

FOREIGN PATENT DOCUMENTS

| CN | 102556025 | 7/2012 |
| CN | 103241233 | 8/2013 |

(Continued)

OTHER PUBLICATIONS

Office Action dated Jul. 11, 2018 for Chinese Patent Application No. 201610940386.3 and its English machine translation by Global Dossier.

(Continued)

*Primary Examiner* — Robert A. Siconolfi
*Assistant Examiner* — San M Aung
(74) *Attorney, Agent, or Firm* — Ladas & Parry, LLP

(57) ABSTRACT

An electric brake system is disclosed. The electric brake system includes a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders, a first hydraulic circuit including a first hydraulic flow path communicating with the first pressure chamber, and first and second branching flow paths that branch from the first hydraulic flow path to be connected to two wheel cylinders, respectively, a second hydraulic circuit including a second hydraulic flow path communicating with the second pressure chamber, and third and fourth branching flow paths that branch from the (Continued)

second hydraulic flow path to be connected to two wheel cylinders, respectively, and first to fourth inlet valves configured to control an opening and closing of the first to fourth branching flow paths, respectively.

17 Claims, 16 Drawing Sheets

(51) Int. Cl.
    *B60T 8/40*     (2006.01)
    *B60T 11/20*     (2006.01)
    *B60T 13/66*     (2006.01)
    *B60T 13/68*     (2006.01)
    *B60T 13/74*     (2006.01)

(52) U.S. Cl.
    CPC .......... *B60T 13/662* (2013.01); *B60T 13/686* (2013.01); *B60T 13/745* (2013.01); *B60T 8/348* (2013.01); *B60T 8/4018* (2013.01); *B60T 2270/82* (2013.01)

(58) Field of Classification Search
    CPC ...... B60T 11/20; B60T 13/662; B60T 13/686; B60T 13/745; B60T 2270/82
    USPC .................................. 303/20, 139, 116.4, 11
    See application file for complete search history.

(56) References Cited

U.S. PATENT DOCUMENTS

| | | | | |
|---|---|---|---|---|
| 2007/0126282 A1* | 6/2007 | Hwang | ................. | B60T 8/4081 303/10 |
| 2008/0179941 A1* | 7/2008 | Matsushita | ........... | B60T 8/3275 303/20 |
| 2012/0193975 A1* | 8/2012 | Ishii | ...................... | B60T 8/4081 303/14 |
| 2012/0326491 A1* | 12/2012 | Gotoh | ................... | B60T 8/4081 303/6.01 |
| 2013/0119752 A1* | 5/2013 | Roll | ........................ | B60T 8/326 303/189 |
| 2013/0213025 A1 | 8/2013 | Linden | | |
| 2013/0214587 A1* | 8/2013 | Yang | .................... | B60T 13/686 303/6.01 |
| 2013/0307322 A1* | 11/2013 | Kim | ........................ | B60T 7/042 303/6.01 |
| 2014/0008965 A1* | 1/2014 | Ito | ........................ | B60T 8/4081 303/3 |
| 2014/0303865 A1* | 10/2014 | Bohm | ................... | B60T 13/745 701/70 |
| 2015/0008727 A1* | 1/2015 | Kidera | ................... | B60T 8/885 303/16 |
| 2015/0175146 A1* | 6/2015 | Quirant | ................. | B60T 13/662 303/14 |

FOREIGN PATENT DOCUMENTS

| | | |
|---|---|---|
| CN | 103373334 | 10/2013 |
| CN | 104276156 | 1/2015 |
| EP | 2 520 473 | 11/2012 |
| EP | 2 671 769 | 12/2013 |
| JP | 2012-158213 | 8/2012 |
| WO | 2012/017037 | 2/2012 |

OTHER PUBLICATIONS

Office Action dated Feb. 25, 2019 for Chinese Patent Application No. 201610940386.3 and its English machine translation by Global Dossier.

* cited by examiner

[Fig. 1]
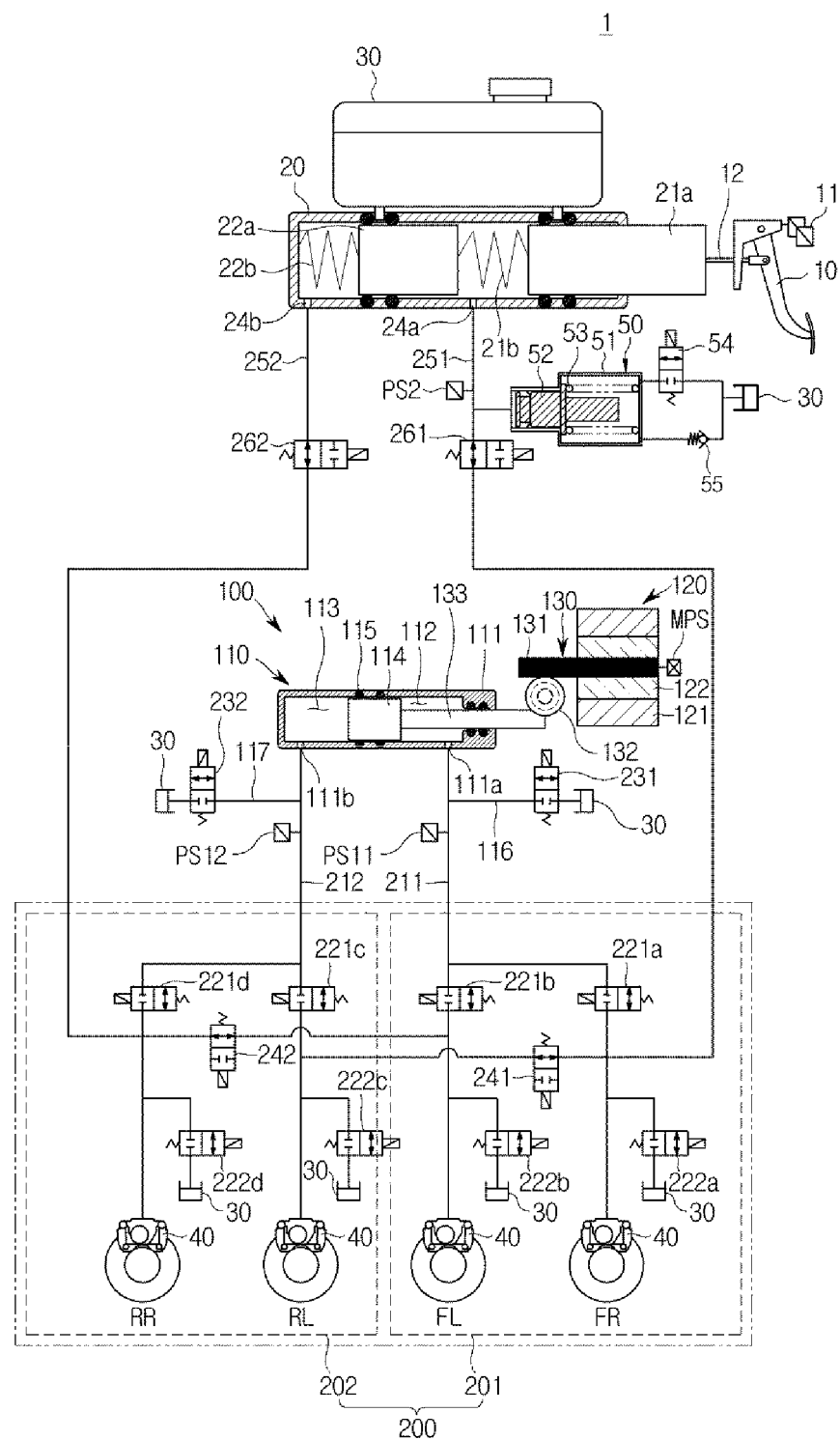

【Fig. 2】
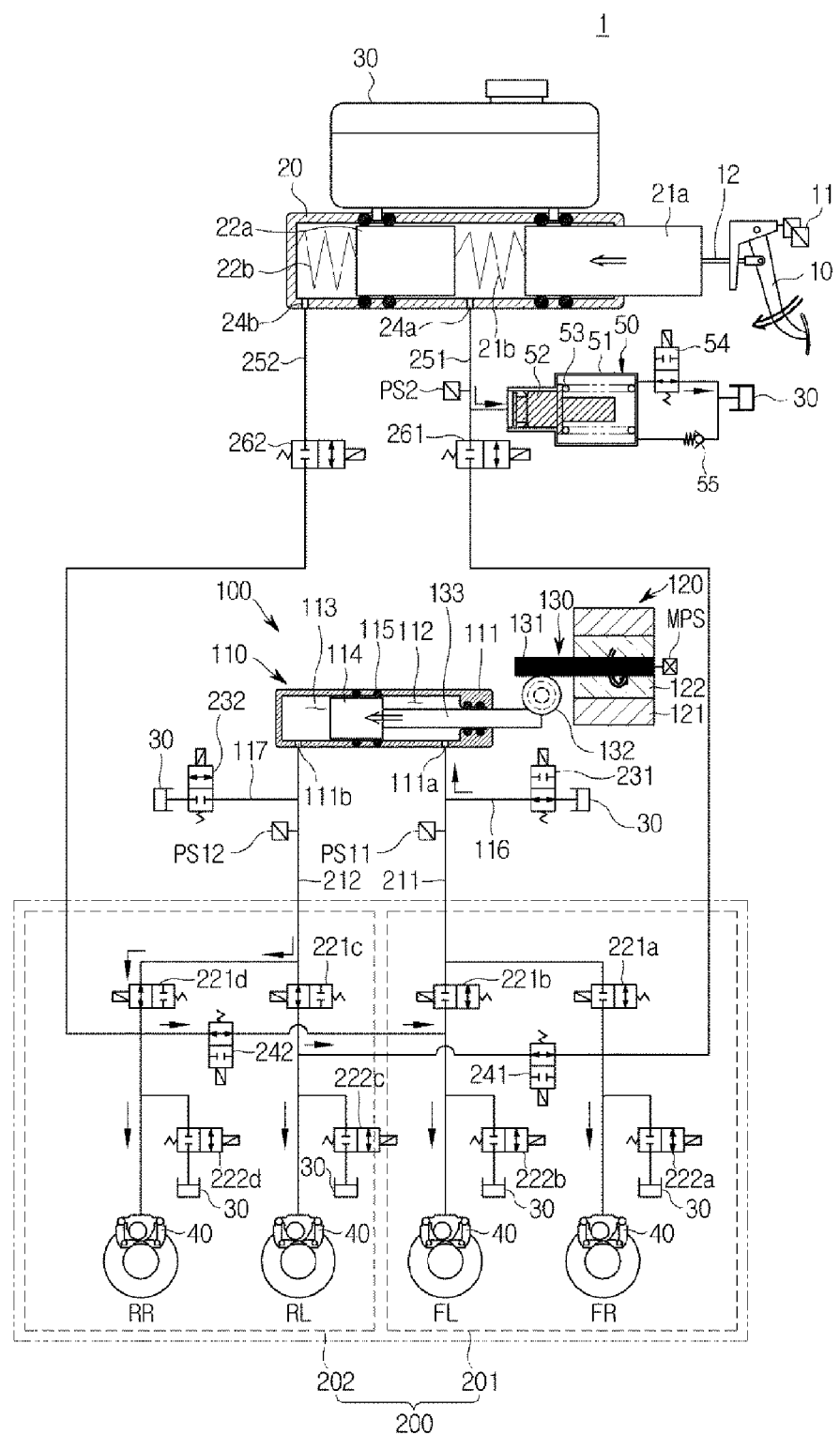

【Fig. 3】
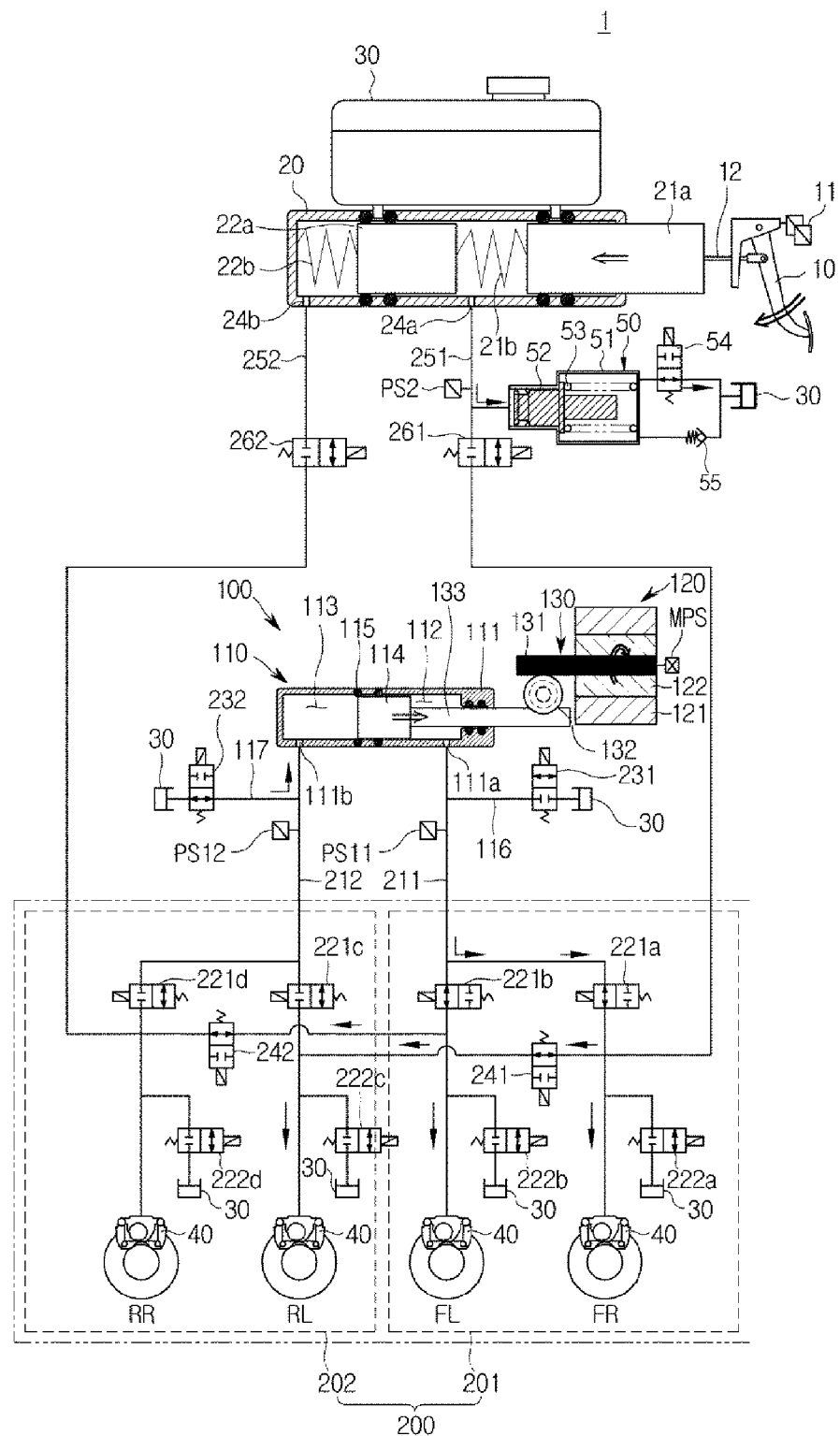

[Fig. 4]
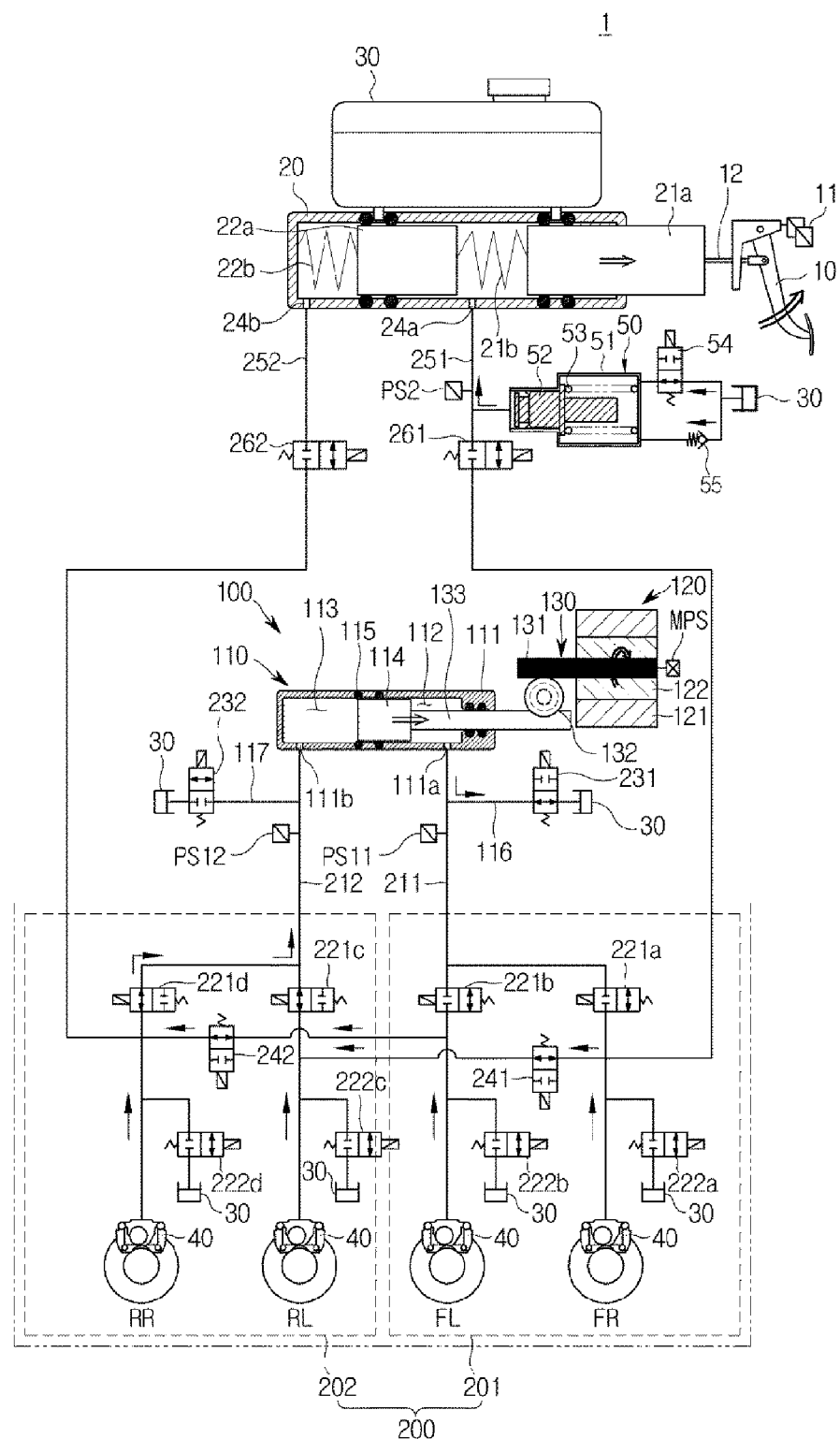

[Fig. 5]
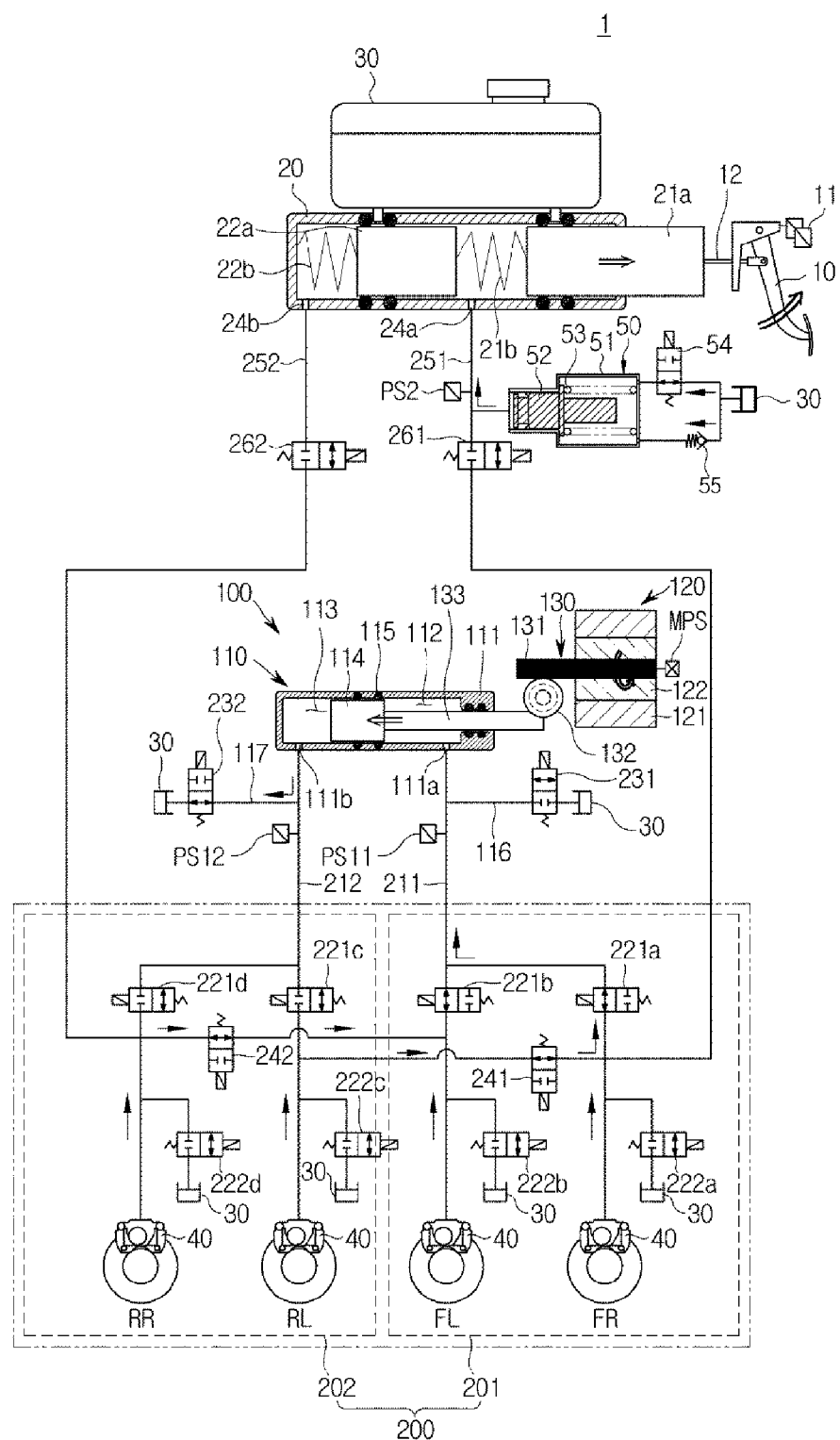

[Fig. 6]
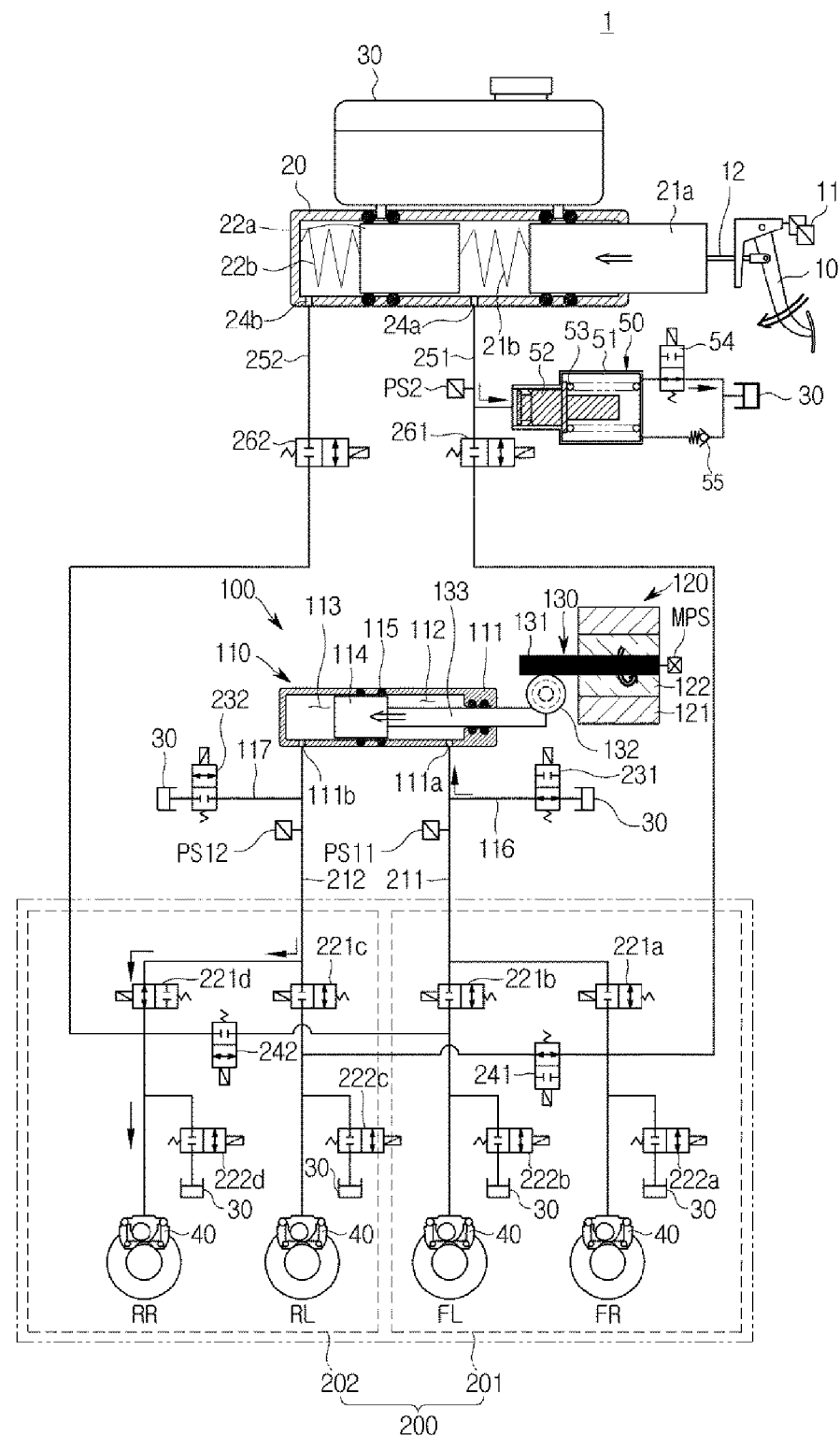

[Fig. 7]
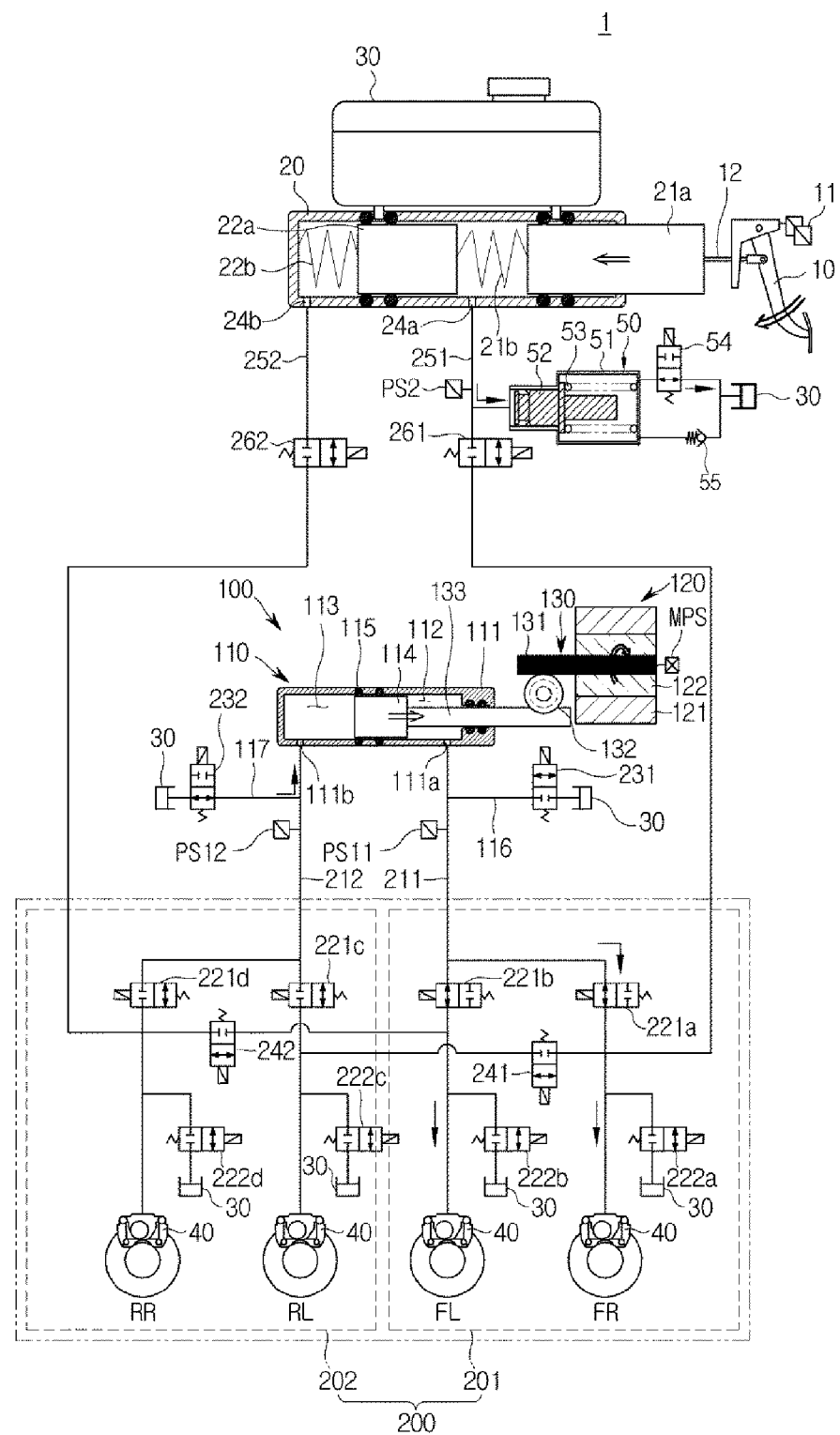

[Fig. 8]
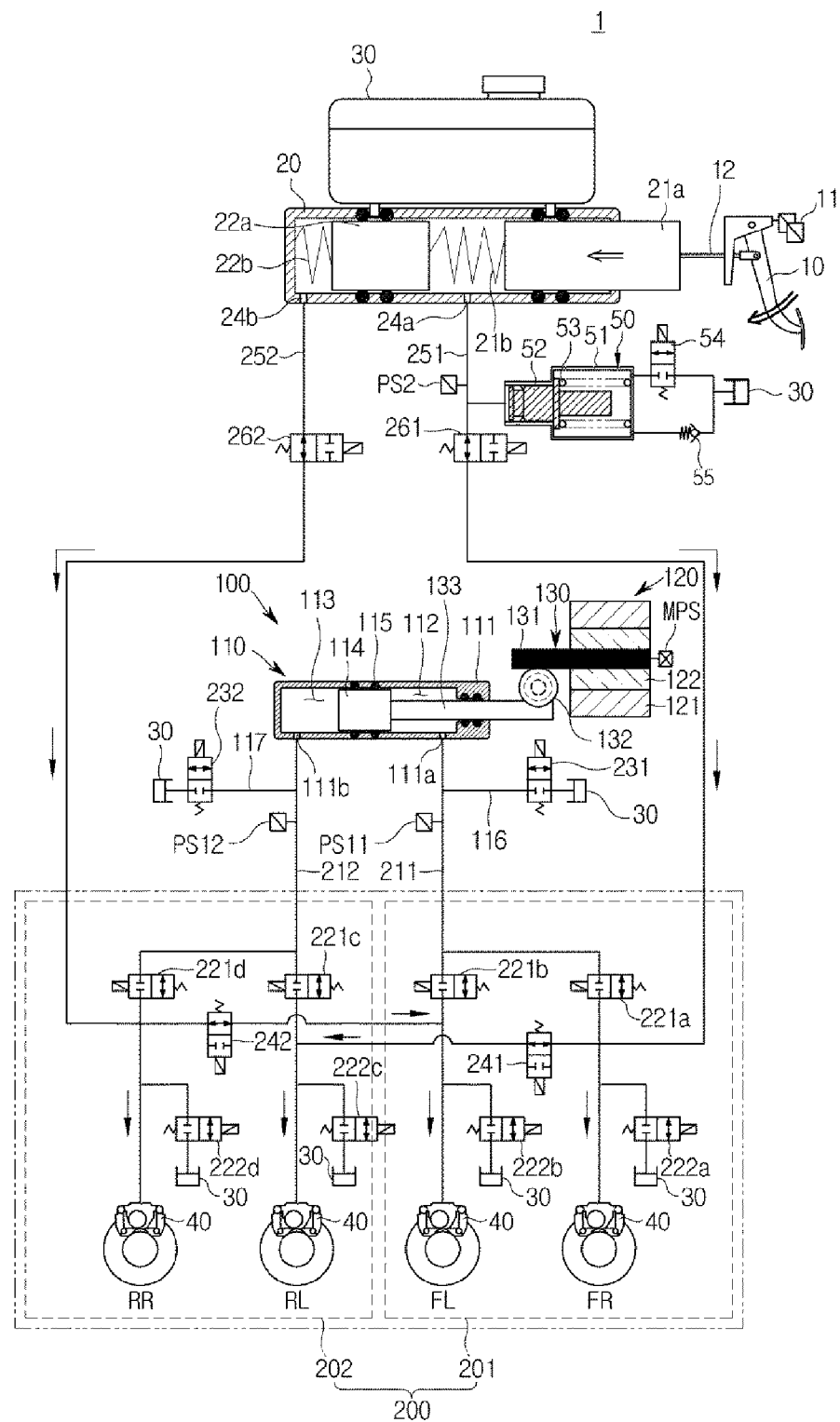

[Fig. 9]
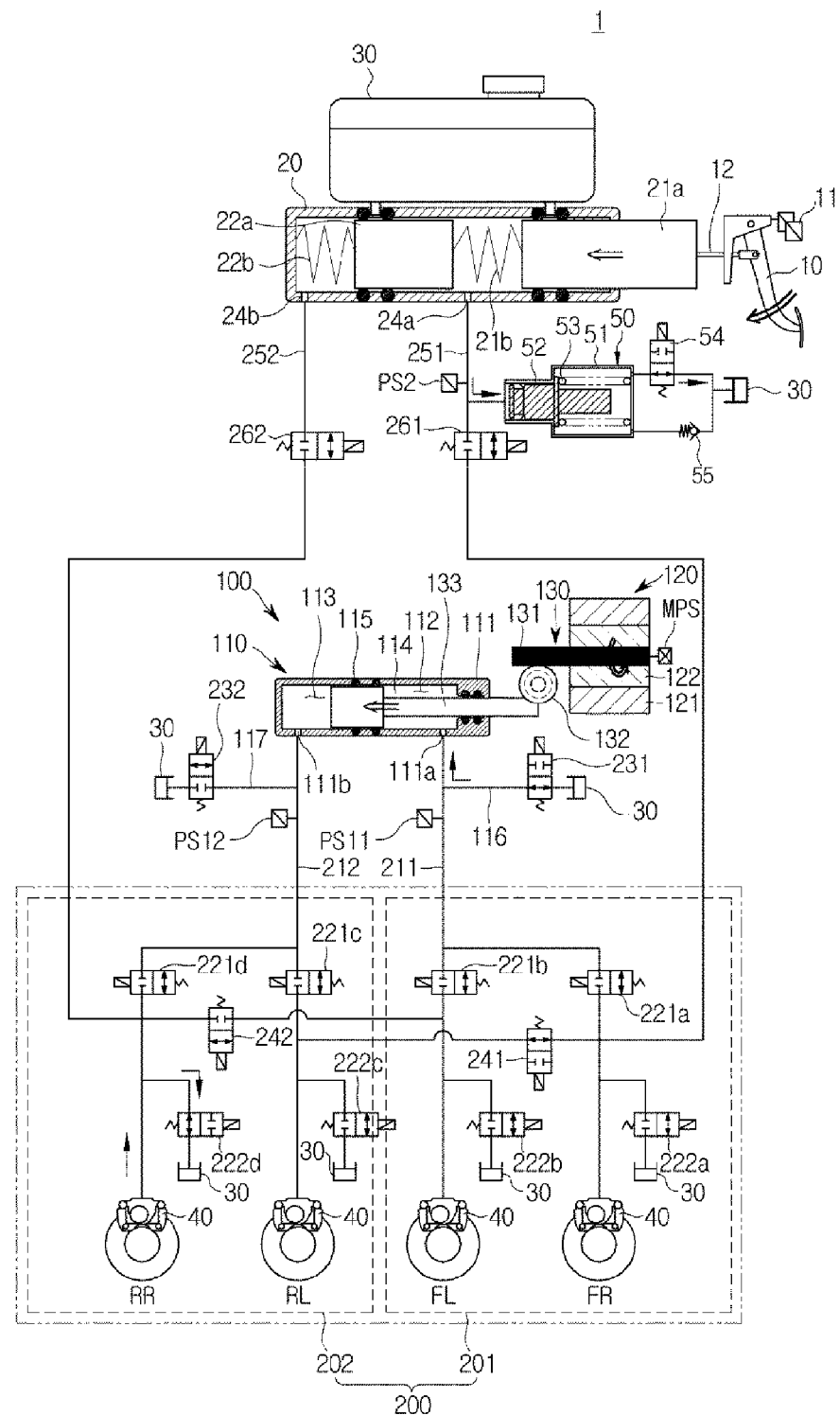

[Fig. 10]
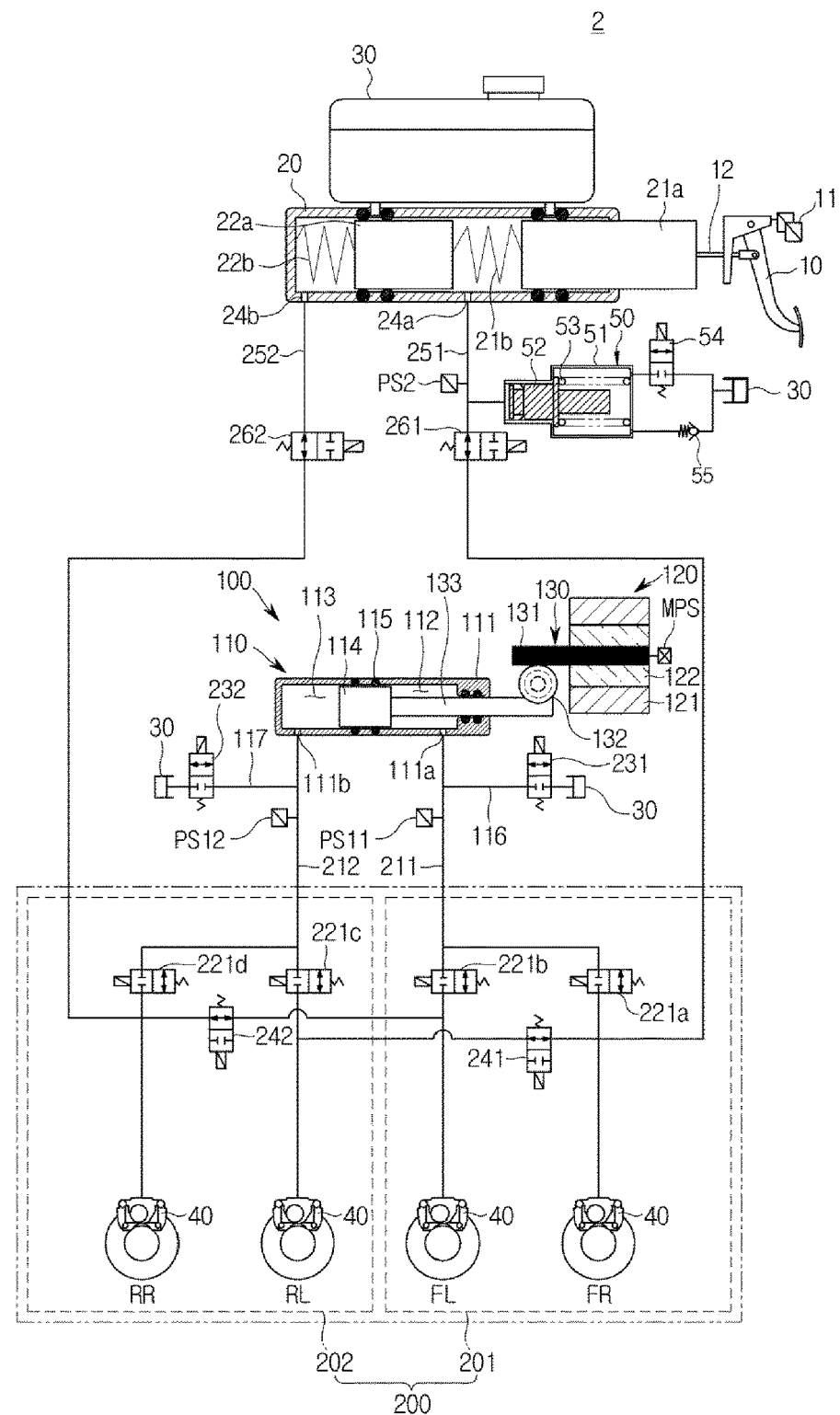

[Fig. 11]
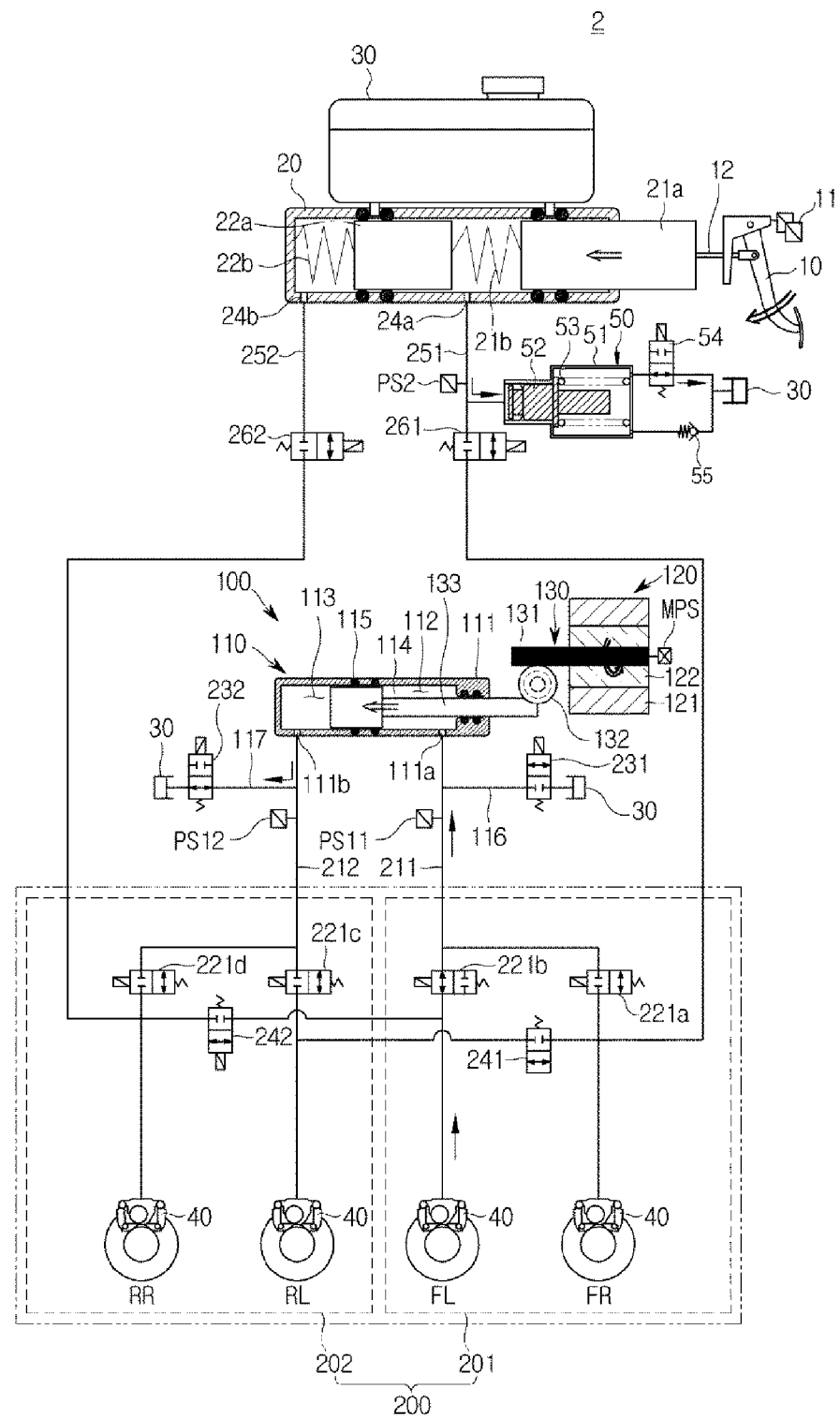

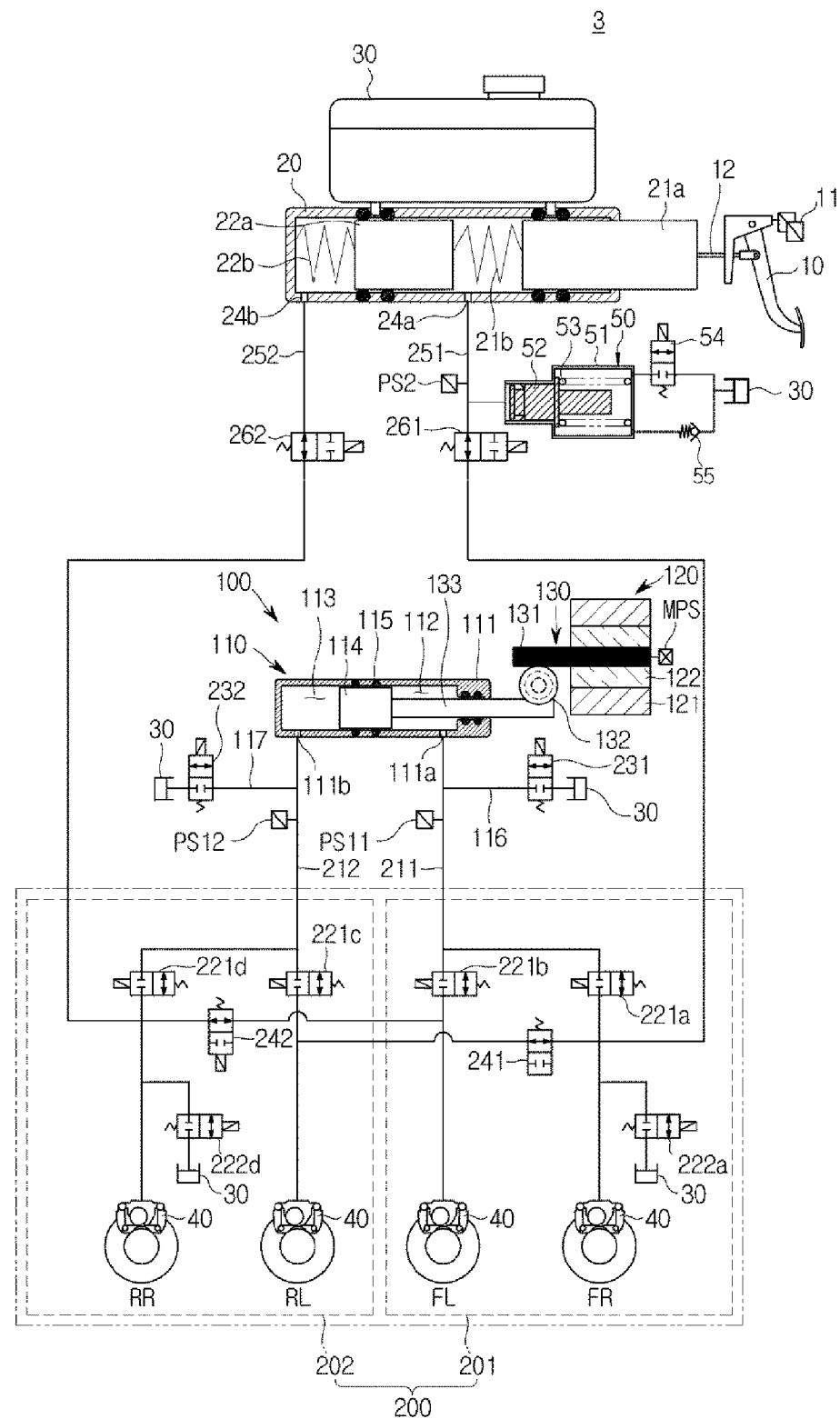
[Fig. 12]

[Fig. 13]
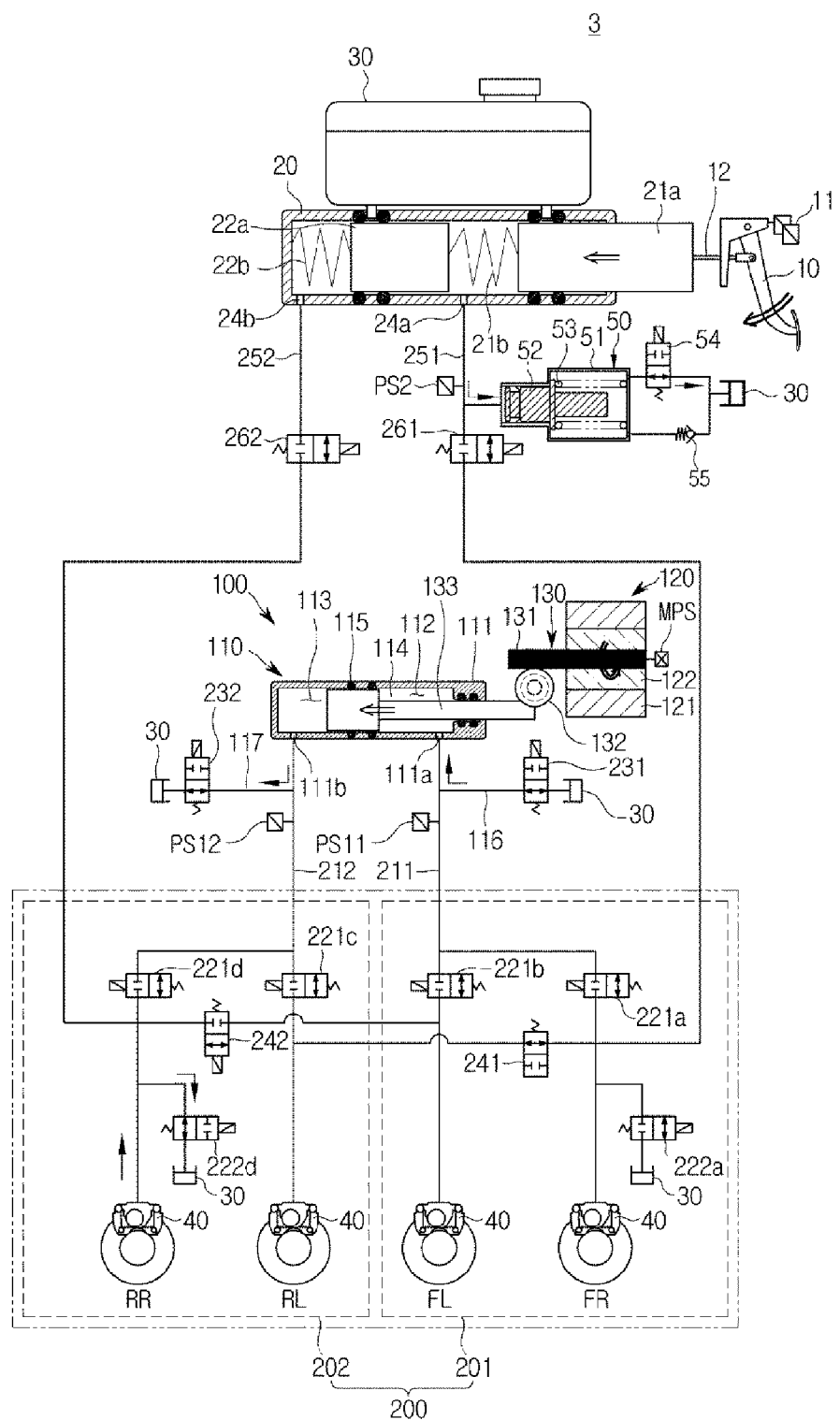

[Fig. 14]
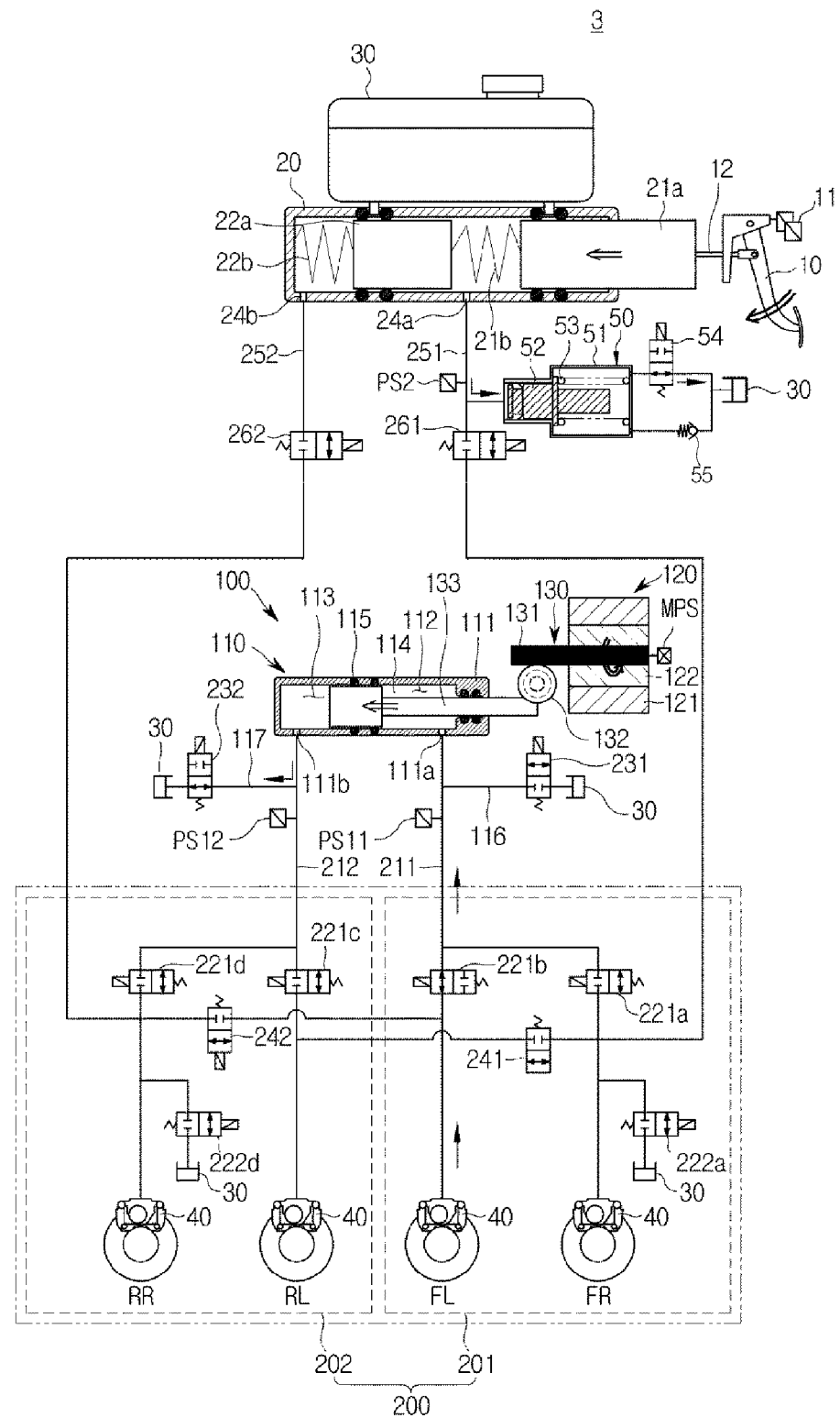

[Fig. 15]
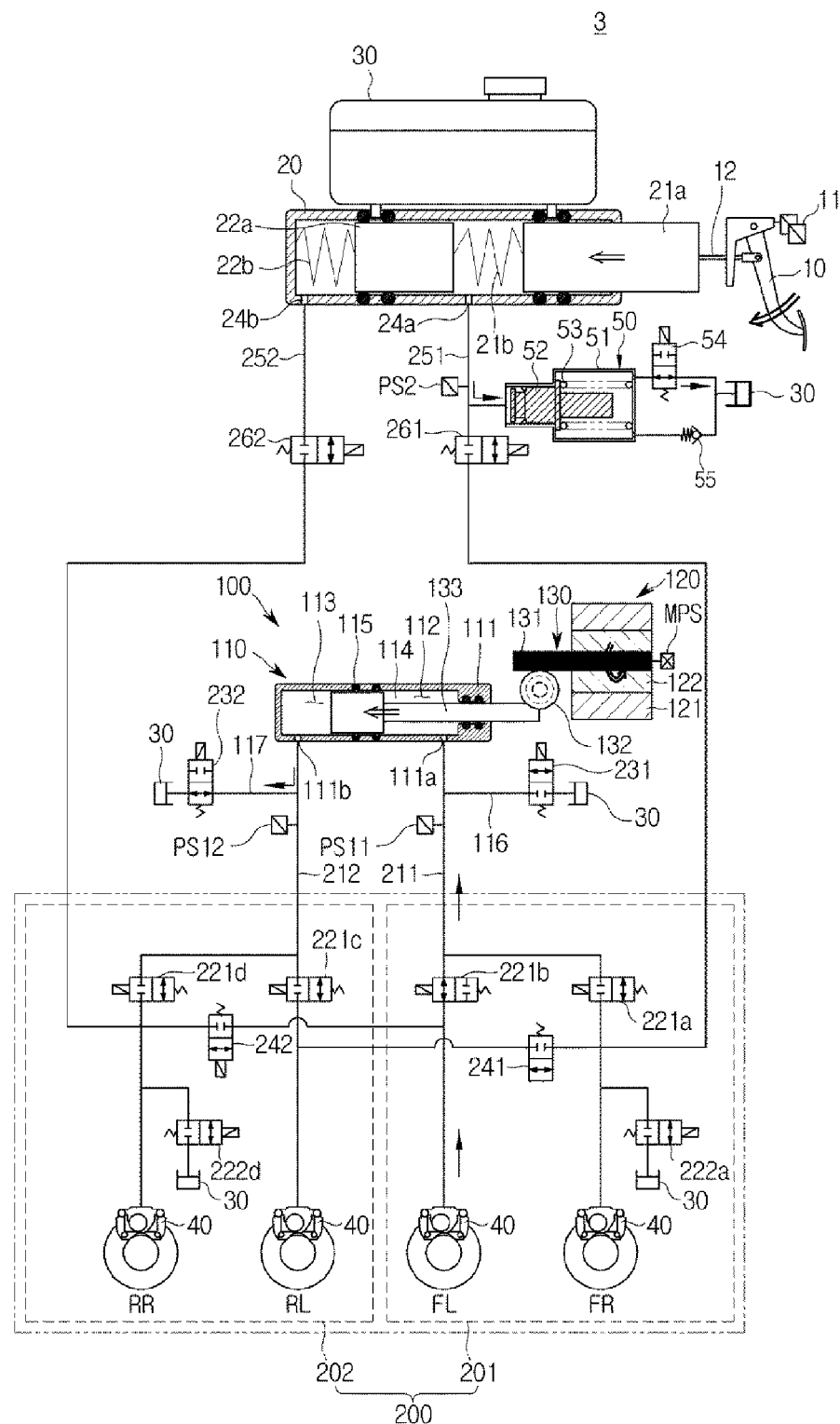

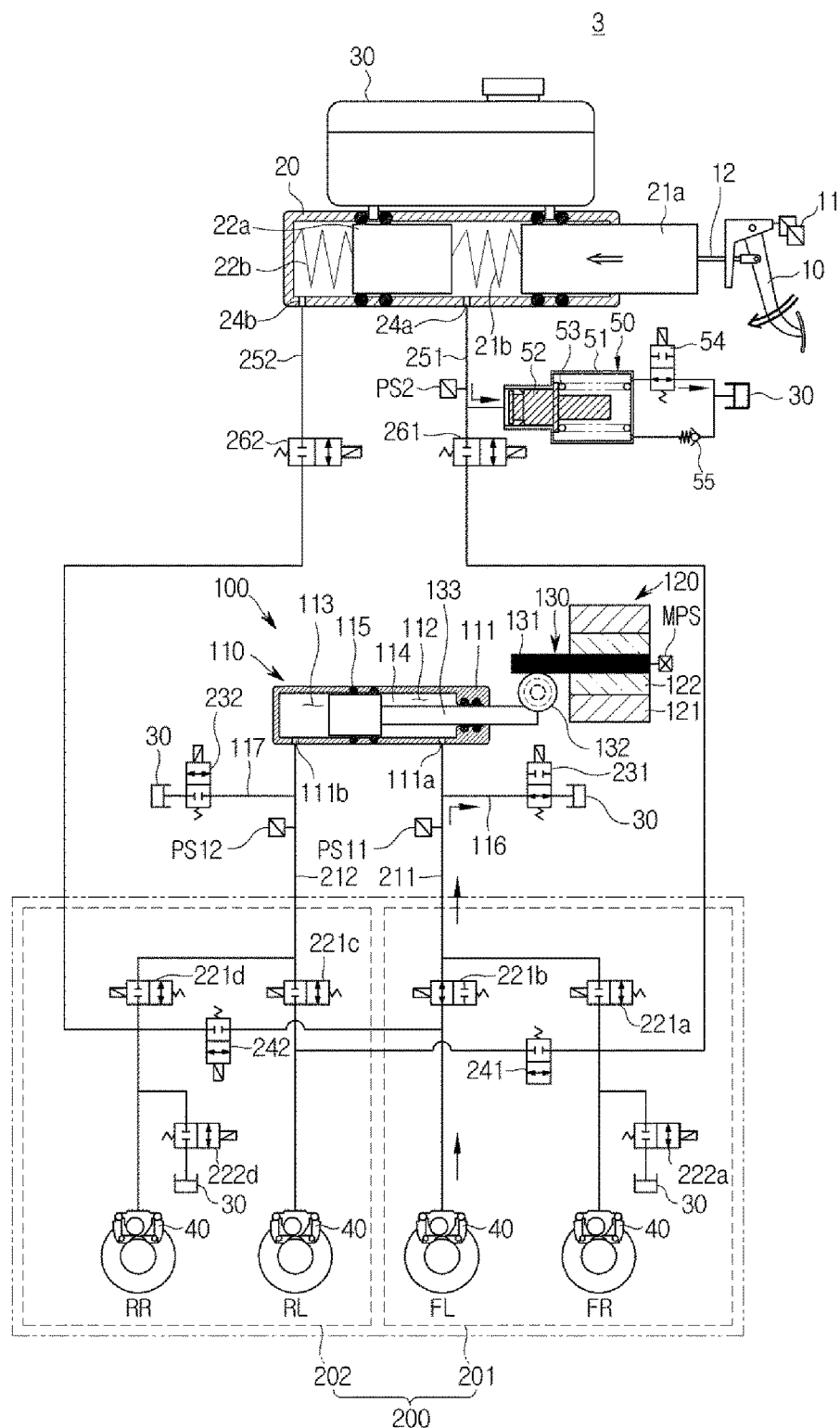
[Fig. 16]

ELECTRIC BRAKE SYSTEM

This application claims the benefit of Korean Patent Application No. 2015-0128852, filed on Sep. 11, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal.

2. Description of the Related Art

A brake system for braking is necessarily mounted on a vehicle, and a variety of systems for providing stronger and more stable braking have been proposed recently.

For example, there are brake systems including an antilock brake system (ABS) for preventing a wheel from sliding while braking, a brake traction control system (BTCS) for preventing a driving wheel from slipping when a vehicle is unintentionally or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

Prior Art Document (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system including a hydraulic pressure supply device that is operated with double action.

Additional aspects of the disclosure will be set forth in part in the description which follows and, in part, will be obvious from the description, or may be learned by practice of the disclosure.

In accordance with one aspect of the present invention, there is provided an electric brake system, which comprises a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders; a first hydraulic circuit including a first hydraulic flow path communicating with the first pressure chamber, and first and second branching flow paths that branch from the first hydraulic flow path to be connected to two wheel cylinders, respectively; a second hydraulic circuit including a second hydraulic flow path communicating with the second pressure chamber, and third and fourth branching flow paths that branch from the second hydraulic flow path to be connected to two wheel cylinders, respectively; and first to fourth inlet valves configured to control an opening and closing of the first to fourth branching flow paths, respectively.

Also, the hydraulic pressure supply device includes the cylinder block; the piston movably accommodated inside the cylinder block and configured to perform a reciprocal movement by means of a rotational force of a motor; the first pressure chamber comparted by means of the one side of the piston and the cylinder block, and configured to communicate with the first hydraulic circuit connected to the two wheel cylinders; and the second pressure chamber comparted by means of the other side of the piston and the cylinder block, and configured to communicate with the second hydraulic circuit connected to the two wheel cylinders.

Also, the electric brake system further comprises a first dump valve installed at a first dump flow path that branches from the first hydraulic flow path and connects a reservoir storing oil therein to the first pressure chamber; and a second dump valve installed at a second dump flow path that branches from the second hydraulic flow path and connects the reservoir to the second pressure chamber.

Also, the first dump valve controls an opening and closing of the first dump flow path, and the second dump valve controls an opening and closing of the second dump flow path.

Also, the first dump flow path branches from the first hydraulic flow path, and the second dump flow path branches from the second hydraulic flow path.

Also, each of the first dump valve and the second dump valve is a normally closed type valve that is usually closed and is opened when an opening signal is received.

Also, the electric brake system further comprises a balance valve configured to control an opening and closing of a balance flow path connecting the first hydraulic circuit to the second hydraulic circuit.

Also, the electric brake system further comprises a first balance valve configured to control an opening and closing of a first balance flow path connecting the first branching flow path to the third branching flow path; and a second balance valve configured to control an opening and closing of a second balance flow path connecting the second branching flow path to the fourth branching flow path.

Also, the first balance flow path and the second balance flow path are provided at a downstream side of the first to fourth inlet valves.

Also, the electric brake system further comprises outlet valves configured to control an opening and closing of a flow path that branches from one or more branching flow paths among the first to fourth branching flow paths to be connected to a reservoir storing oil therein.

Also, the outlet valves are normally closed type valves that are usually closed and are opened when an opening signal is received.

Also, the outlet valves include first to fourth outlet valves configured to respectively control an opening and closing of a flow path that branches from each of the first to fourth branching flow paths to be connected to the reservoir.

In accordance with other aspect of the present invention, there is provided an electric brake system, which comprises a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders; a first hydraulic circuit configured to include a first hydraulic flow path connecting the first pressure chamber to the one or more of wheel cylinders; a second hydraulic circuit configured to include a second hydraulic flow path connecting the second pressure chamber to the one or more of wheel cylinders; a first dump valve installed at a first dump flow path branching from the first hydraulic flow path and connecting a reservoir for storing oil therein to the first pressure chamber; a second dump valve installed at a second dump flow path branching from the second hydraulic flow path and connecting the reservoir to the second pressure chamber; a plurality of inlet valves configured to independently control an opening and closing of each of the first and second hydraulic flow paths; and an electronic control unit (ECU) configured to control an operation of a motor and an opening and closing of each of the valves, and execute a dump mode that discharges hydraulic pressure of a single wheel cylinder among the one or more wheel cylinders.

Also, the dump mode includes a first dump mode which opens inlet valves connected to the one or more wheel cylinders among the plurality of inlet valves, and opens the first dump valve or the second dump valve which is connected to the opened inlet valves to discharge hydraulic pressure of the one or more wheel cylinders to the reservoir.

Also, the dump mode includes a second dump mode which opens inlet valves connected to the one or more wheel cylinders among the plurality of inlet valves, and moves the piston in a direction which increases a volume of the first pressure chamber or the second pressure chamber, which is connected to the one or more wheel cylinders to discharge hydraulic pressure of the one or more wheel cylinders to the first pressure chamber or the second pressure chamber.

Also, the dump mode includes a third dump mode which opens inlet valves connected to the one or more wheel cylinders among the plurality of inlet valves to discharge hydraulic pressure of the one or more wheel cylinders to the reservoir.

BRIEF DESCRIPTION OF THE DRAWINGS

FIG. 1 is a hydraulic circuit diagram illustrating a non-braking state of an electric brake system according to one embodiment of the present disclosure.

FIGS. 2 and 3 are hydraulic circuit diagrams illustrating a state in which the electric brake system according to one embodiment of the present disclosure normally performs a braking operation, FIG. 2 is a hydraulic circuit diagram illustrating a situation in which braking pressure is provided while the hydraulic piston is moved forward, and FIG. 3 is a hydraulic circuit diagram illustrating a situation in which braking pressure is provided while the hydraulic piston is moved backward.

FIGS. 4 and 5 are hydraulic circuit diagrams illustrating a state in which the electric brake system according to one embodiment of the present disclosure releases braking normally, FIG. 4 is a hydraulic circuit diagram illustrating a situation in which braking pressure is released while the hydraulic piston is moved backward, and FIG. 5 is a hydraulic circuit diagram illustrating a situation in which braking pressure is released while the hydraulic piston is moved forward.

FIGS. 6 and 7 are hydraulic circuit diagrams illustrating a state in which an anti-lock brake system (ABS) is operated through the electric brake system according to one embodiment of the present disclosure, FIG. 6 is a hydraulic circuit diagram illustrating a situation in which the hydraulic piston is moved forward and selective braking is performed, and FIG. 7 is a hydraulic circuit diagram illustrating a situation in which the hydraulic piston is moved backward and selective braking is performed.

FIG. 8 is a hydraulic circuit diagram illustrating a case in which the electric brake system according to one embodiment of the present disclosure operates abnormally.

FIG. 9 is a hydraulic circuit diagram illustrating a state in which the electric brake system according to one embodiment of the present disclosure operates in a dump mode.

FIG. 10 is a hydraulic circuit diagram illustrating a non-braking state of an electric brake system according to another embodiment of the present disclosure.

FIG. 11 is a hydraulic circuit diagram illustrating a state in which the electric brake system according to another embodiment of the present disclosure operates in a first dump mode.

FIG. 12 is a hydraulic circuit diagram illustrating a state in which the electric brake system according to another embodiment of the present disclosure operates in a second dump mode.

FIG. 13 is a hydraulic circuit diagram illustrating a non-braking state of an electric brake system according to another embodiment of the present disclosure.

FIGS. 14 to 16 are hydraulic circuit diagrams illustrating a state in which the electric brake system according to still another embodiment of the present disclosure operates in a dump mode.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to one embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a may be provided at the two chambers, respectively, and the first piston 21a may be connected to the input rod 12. Further, the master cylinder 20 may include first and second hydraulic ports 24a and 24b which are formed thereon and through which hydraulic pressure is delivered from each of the two chambers.

Meanwhile, the master cylinder 20 may include two chambers to secure safety when one chamber fails. For example, one of the two chambers may be connected to a front right wheel FR and a rear left wheel RL, and the remaining chamber may be connected to a front left wheel FL and a rear right wheel RR. As described above, the two chambers may be independently configured so that braking of a vehicle may be possible even when one of the two chambers fails.

Also, unlike shown in the drawing, one of the two chambers may be connected to two front wheels FR and FL and the remaining chamber may be connected to two rear wheels RR and RL. In addition to the described above, one of the two chambers may be connected to the front left wheel FL and the rear left wheel RL, and the remaining chamber may be connected to the rear right wheel RR and the front right wheel FR. In other words, a variety of connected configurations may be established between the chambers of the master cylinder 20 and the wheels.

Further, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided at the two chambers, respectively, to store an elastic force when the first piston 21a and the second piston 22a are compressed according to a variance of a displacement of the brake pedal 10.

Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to a pedal effort of the brake pedal 10. The reaction force may be provided to compensate for a pedal effort provided from a driver such that a braking force may be finely controlled as intended by the driver.

Referring to FIG. 1, the simulation device 50 includes a simulation chamber 51 provided to store oil discharged from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. The reservoirs may be configured with the same components, and may alternatively be configured with different components. As one example, the reservoir 30 connected to the simulation device 50 may be the same as the reservoir 30 connected to the master cylinder 20, or may be a storage part capable of storing oil separately from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver brake oil between the simulation chamber 51 and the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided with two wheels, and controlling a hydraulic pressure flow delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 54, 221a, 221b, 221c, 221d, 222a, 222b, 222c, 222d, 231, 232, 241, and 242 on the basis of hydraulic pressure information and pedal displacement information.

The hydraulic pressure supply device 100 may include a hydraulic pressure supply unit 110 for providing oil pressure delivered to the wheel cylinder 40, a motor 120 for generating a rotational force in response to an electrical signal of the pedal displacement sensor 11, and a power conversion unit 130 for converting a rotational movement of the motor 120 into a rectilinear movement and transmitting the rectilinear movement to the hydraulic pressure supply unit 110. Also, the hydraulic pressure supply unit 110 may be operated by means of pressure provided from a high pressure accumulator instead of a driving force supplied from the motor 120.

The hydraulic pressure supply unit 110 includes a cylinder block 111 in which a pressure chamber for receiving and storing oil therein is formed, a hydraulic piston 114 accommodated in the cylinder block 111, and a sealing member 115 provided between the hydraulic piston 114 and the cylinder block 111 to seal the pressure chamber.

The pressure chamber may include a first pressure chamber 112 located at a rear side (in a backward movement direction, that is, a rightward direction of the drawing) of the hydraulic piston 114, and a second pressure chamber 113 located at a front side (in a forward movement direction, that is, a leftward direction of the drawing) of the hydraulic piston 114. In other words, the first pressure chamber 112 is comparted by means of the cylinder block 111 and a rear end of the hydraulic piston 114 and is provided to have a volume that varies according to a movement of the hydraulic piston 114, and the second pressure chamber 113 is comparted by means of the cylinder block 111 and a front end of the hydraulic piston 114 and is provided to have a volume that varies according to the movement of the hydraulic piston 114

The first pressure chamber 112 is connected to a first hydraulic flow path 211 through a first communicating hole 111a formed at a rear side of the cylinder block 111, and the second pressure chamber 113 is connected to a second hydraulic flow path 212 through a second communicating hole 111b formed at a front side of the cylinder block 111. The first hydraulic flow path 211 connects the hydraulic pressure supply unit 110 to the first hydraulic circuit 201, and the second hydraulic flow path 212 connects the hydraulic pressure supply unit 110 to the second hydraulic circuit 202.

The sealing member 115 seals between the first pressure chamber 112 and the second pressure chamber 113. In other words, hydraulic pressure or negative pressure of the first pressure chamber 112, which is generated while the hydraulic piston 114 is moved forward or backward, may be blocked by the sealing member 115 and may be delivered to the first hydraulic flow path 211 without leaking into the second pressure chamber 113.

The pressure chamber may be connected to reservoir 30 through dump flow paths 116 and 117, and receive and store oil supplied from the reservoir 30 or deliver oil inside the pressure chamber to the reservoir 30. As one example, the dump flow paths may include a first dump flow path 116 branching from the first hydraulic flow path 211 and connected to the reservoir 30, and a second dump flow path 117 branching from the second hydraulic flow path 212 and connected to the reservoir 30.

Also, the electric brake system 1 according to one embodiment of the present disclosure may further include dump valves 231 and 232 which control opening and closing of the dump flow paths 116 and 117. The dump valves 231 and 232 may be configured with a normally closed type solenoid valve that is usually closed and is opened when an opening signal is received.

The dump valves include a first dump valve 231 installed at the first dump flow path 116 to control an oil flow, and a second dump valve 232 installed at the second dump flow path 117 to control an oil flow. The dump flow paths 116 and 117, at which the dump valves 231 and 232 are installed, may be connected to the pressure chambers 112 and 113 of the hydraulic pressure supply device 100 and the hydraulic flow paths 211 and 212, and may control pressure to converge on a target pressure value when the pressure is generated higher than the target pressure value set according to a pedal effort of the brake pedal 10.

Also, the hydraulic pressure supply unit 110 of the electric brake system 1 according to one embodiment of the present disclosure may operate in double action. In other words, hydraulic pressure, which is generated in the second pressure chamber 113 while the hydraulic piston 114 is moved forward, may be delivered to the second hydraulic circuit 202 to activate the wheel cylinders 40 installed at the rear right wheel RR and the rear left wheel RL. In addition, negative pressure, which is generated in the first pressure chamber 112 while the hydraulic piston 114 is moved forward, may be delivered to the first hydraulic circuit 201 to activate the wheel cylinders 40 installed at the front left wheel FL and the front right wheel FR.

Similarly, hydraulic pressure, which is generated in the first pressure chamber 112 while the hydraulic piston 114 is moved backward, may be delivered to the first hydraulic circuit 201 to activate the wheel cylinders 40 installed at the front left wheel FL and the front right wheel FR. In addition, negative pressure, which is generated in the second pressure chamber 113 while the hydraulic piston 114 is moved backward, may be delivered to the second hydraulic circuit 202 to activate the wheel cylinders 40 installed at the rear right wheel RR and the rear left wheel RL.

The motor 120 is a device for generating a rotational force according to a signal output from the ECU (not shown) and may generate the rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120, but also valves 54, 221a, 221b, 221c, 221d, 222a, 222b, 222c, 222d, 231, 232, 241, and 242 provided at the electric brake system 1 of the present disclosure, which will be described below. An operation of controlling a plurality of valves according to a displacement of the brake pedal 10 will be described below.

A driving force of the motor 120 generates a displacement of the hydraulic piston 114 through the power conversion unit 130, and hydraulic pressure, which is generated while the hydraulic piston 114 slides inside the pressure chamber, is delivered to the wheel cylinder 40 installed at each of the wheels RR, RL, FR, and FL through the first and second hydraulic flow paths 211 and 212.

The power conversion unit 130 is a device for converting a rotational force into a rectilinear movement, and, as one example, may be configured with a worm shaft 131, a worm wheel 132, and a drive shaft 133.

The worm shaft 131 may be integrally formed with a rotational shaft of the motor 120, and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the hydraulic piston 114 to slide the hydraulic piston 114 inside the cylinder block 111.

To describe such operations again, a signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the hydraulic piston 114 connected to the drive shaft 133 is moved forward to generate hydraulic pressure in the pressure chamber.

On the other hand, when the pedal effort is released from the brake pedal 10, the ECU drives the motor 120 in a reverse direction to reversely rotate the worm shaft 131. Consequently, the worm wheel 132 is also reversely rotated, and then the hydraulic piston 114 connected to the drive shaft 133 is returned to its original position.

A signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the hydraulic piston 114 connected to the drive shaft 133 is moved forward to generate hydraulic pressure in the second pressure chamber 113.

On the other hand, when the pedal effort is released from the brake pedal 10, the ECU drives the motor 120 in a reverse direction, and thus the worm shaft 131 is reversely rotated. Consequently, the worm wheel 132 is also reversely rotated, and thus negative pressure is generated in the second pressure chamber 113 while the hydraulic piston 114 connected to the drive shaft 133 is returned to its original position, that is, is moved backward.

Meanwhile, it is possible for the generation of hydraulic pressure and the negative pressure to be opposite that which is described above. That is, the signal, which is sensed by the pedal displacement sensor 11 when the displacement occurs at the brake pedal 10, is transmitted to the ECU (not shown), and then the ECU activates the motor 120 in the reverse direction to reversely rotate the worm shaft 131. The rotational force of the worm shaft 131 is transmitted to the drive shaft 133 via the worm wheel 132, and then the hydraulic piston 114 connected to the drive shaft 133 is moved backward to generate hydraulic pressure in the first pressure chamber 112.

On the other hand, when the pedal effort is released from the brake pedal 10, the ECU drives the motor 120 in the one direction, and thus the worm shaft 131 is rotated in the one direction. Consequently, the worm wheel 132 is also reversely rotated, and thus negative pressure is generated in the first pressure chamber 112 while the hydraulic piston 114 connected to the drive shaft 133 is returned to its original position, that is, is moved forward.

As described above, the hydraulic pressure supply device 100 serves to deliver the hydraulic pressure to the wheel cylinders 40 or to discharge and deliver the hydraulic pressure to the reservoir 30 according to a rotational direction of the rotational force generated from the motor 120.

Meanwhile, when the motor 120 is rotated in the one direction, the hydraulic pressure may be generated in the second pressure chamber 113 or the negative pressure may be generated in the first pressure chamber 112, and whether the hydraulic pressure is used for braking or the negative pressure is used for releasing braking may be determined through control of the valves 221a, 221b, 221c, 221d, 222a, 222b, 222c, 222d, 231, 232, 241, and 242. This will be described in detail below.

Although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft, and a ball nut which is screw-coupled to the screw in a state in which a rotation of the ball nut is restricted to perform a rectilinear movement according to a rotation of the screw. The hydraulic piston 114 is connected to the ball nut of the power conversion unit 130 to pressurize the pressure chamber by means of the rectilinear movement of the ball nut. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Further, the electric brake system 1 according to one embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24a to the first hydraulic circuit 201, and the second backup flow path 252 may connect the second hydraulic port 24b to the second hydraulic circuit 202.

Further, the first and second cut valves 261 and 262 may be configured with a normally opened type solenoid valve that is usually open and is closed when a closing signal is received from the ECU.

Next, the hydraulic control unit 200 according to one embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the front left wheel FL, and the second hydraulic circuit 202 may control the rear left wheel RL and the rear right wheel RR. Further, the wheel cylinder 40 is installed at each of the wheels FR, FL, RR, and RL to perform braking by receiving the hydraulic pressure.

The first hydraulic circuit 201 is connected to the first hydraulic flow path 211 to receive the hydraulic pressure provided from the hydraulic pressure supply device 100, and the first hydraulic flow path 211 branches into two flow paths that are connected to the front right wheel FR and the front left wheel FL, respectively. Similarly, the second hydraulic circuit 202 is connected to the second hydraulic flow path 212 to receive the hydraulic pressure provided from the hydraulic pressure supply device 100, and the second hydraulic flow path 212 branches into two flow paths that are connected to the rear left wheel RL and the rear right wheel RR, respectively.

The hydraulic circuits 201 and 202 may be provided with a plurality of inlet valves 221 (that is, 221a, 221b, 221c, and 221d) to control a hydraulic pressure flow. As one example, two inlet valves 221a and 221b may be provided at the first hydraulic circuit 201 and connected to the first hydraulic flow path 211 to independently control the hydraulic pressure delivered to two of the wheel cylinders 40. Also, two inlet valves 221c and 221d may be provided at the second hydraulic circuit 202 and connected to the second hydraulic flow path 212 to independently control the hydraulic pressure delivered to two of the wheel cylinders 40.

Further, the plurality of inlet valves 221 may be disposed at an upstream side of each of the wheel cylinders 40 and may be configured with a normally closed type solenoid valve that is usually closed and is opened when an opening signal is received from the ECU.

Also, the hydraulic control unit 200 may be further provided with a plurality of outlet valves 222 (that is, 222a, 222b, 222c, and 222d) connected to the reservoirs 30 to improve brake release performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU.

In addition, the hydraulic control unit 200 may be connected to the backup flow paths 251 and 252. As one example, the first hydraulic circuit 201 may be connected to the first backup flow path 251 to receive the hydraulic pressure provided from the master cylinder 20, and the second hydraulic circuit 202 may be connected to the second backup flow path 252 to receive the hydraulic pressure provided from the master cylinder 20.

At this point, the first backup flow path 251 may be connected to the first hydraulic circuit 201 at a downstream side of the first inlet valve 221a. Similarly, the second backup flow path 252 may be connected to the second hydraulic circuit 202 at a downstream side of the fourth inlet valve 221d. Consequently, when the first and second cut vales 261 and 262 are closed and the plurality of inlet valves 221a, 221b, 221c, and 221d are opened, the hydraulic pressure provided from the hydraulic pressure supply device 100 may be supplied to the wheel cylinders 40 through the first and second hydraulic flow paths 211 and 212. Also, when the first and second cut vales 261 and 262 are opened and the plurality of inlet valves 221a, 221b, 221c, and 221d are closed, the hydraulic pressure provided from the master cylinder 20 may be supplied to the wheel cylinders 40 through the first and second backup flow paths 251 and 252.

In addition, the hydraulic control unit 200 may further include balance valves 241 and 242 connecting the first hydraulic circuit 201 to the second hydraulic circuit 202. The balance valves include a first balance valve 241, which connects one of the two flow paths branching from the first hydraulic flow path 211 to one of the two flow paths branching from the second hydraulic flow path 212, and a second balance valve 242 which connects the two remaining branching flow paths to each other.

As described above, the first hydraulic flow path 211 branches at the middle thereof and is connected to the front right wheel FR and the front left wheel FL, the second hydraulic flow path 212 branches at the middle thereof and is connected to the rear right wheel RL and the rear right wheel RR. As one example, the first balance valve 241 may connect the flow path connected to the front right wheel FR and the flow path connected to the rear left wheel RL to each other, and the second balance valve 242 may connect the flow path connected to the flow path connected to the rear right wheel RR and the flow path connected to the front left wheel FL.

The balance valves 241 and 242 are provided at the flow paths connecting the first hydraulic circuit 201 and the second hydraulic circuit 202, and serve to connect or block the first and second hydraulic circuits 201 and 202.

Also, the balance valves 241 and 242 may be configured with a normally opened type solenoid valve that is usually open and is closed when a closing signal is received from the ECU.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Hereinafter, an operation of the electric brake system 1 according to one embodiment of the present invention will be described in detail.

FIGS. 2 and 3 are hydraulic circuit diagrams illustrating a state in which the electric brake system 1 according to one embodiment of the present disclosure normally performs a braking operation, FIG. 2 is a hydraulic circuit diagram illustrating a situation in which braking pressure is provided while the hydraulic piston 114 is moved forward, and FIG.

3 is a hydraulic circuit diagram illustrating a situation in which braking pressure is provided while the hydraulic piston 114 is moved backward.

When a driver begins braking, an amount of braking requested by the driver may be sensed through the pedal displacement sensor 11 on the basis of information including pressure on the brake pedal 10 put by the driver, and the like. The ECU (not shown) receives an electrical signal output from the pedal displacement sensor 11 to activate the motor 120.

Also, the ECU may receive an amount of regenerative braking through the backup flow path pressure sensor PS2 provided at an outlet side of the master cylinder 20 and the first and second hydraulic flow path pressure sensors PS11 and PS12 respectively provided at the first and second hydraulic circuits 201 and 202, and may calculate an amount of braking friction based on a difference between the amount of braking requested by the driver and the amount of regenerative braking, thereby determining the magnitude of an increase or reduction of pressure at the wheel cylinder 40.

Referring to FIG. 2, when the driver steps on the brake pedal 10 at an initial stage of braking, the motor 120 is activated to rotate in one direction, and a rotational force of the motor 120 is delivered to the hydraulic pressure supply unit 110 by means of the power conversion unit 130, and thus the hydraulic pressure is generated in the second pressure chamber 113 while the hydraulic piston 114 of the hydraulic pressure supply unit 110 is moved forward. The hydraulic pressure discharged from the hydraulic pressure supply unit 110 is delivered to the wheel cylinder 40 provided at each of the four wheels through the first hydraulic circuit 201 and the second hydraulic circuit 202 to generate a braking force.

In particular, the hydraulic pressure provided from the second pressure chamber 113 is directly delivered to the wheel cylinders 40 provided at the two wheels RR and RL through the second hydraulic flow path 212 connected to the second communicating hole 111b. At this point, the third and fourth inlet valves 221c and 221d, which are respectively installed at the two flow paths branching from the second hydraulic flow path 212, are switched to an opened state. Also, the third and fourth outlet valves 222c and 222d, which are respectively installed at flow paths which respectively branch from the two flow paths branching from the second hydraulic flow path 212, and the second dump valve 232 installed at the second dump flow path 117 are maintained in the closed state to prevent the hydraulic pressure from leaking into the reservoirs 30.

When the pressure delivered to the first and second hydraulic circuits 201 and 202 is measured as being higher than the target pressure value according to the pedal effort of the brake pedal 10, the second dump valve 232 is opened to control the pressure to converge on the target pressure value.

Also, because the first balance valve 241 and the second balance valve 242 are in the opened state, the hydraulic pressure of the second hydraulic circuit 202 may be delivered to the first hydraulic circuit 201. Consequently, the hydraulic pressure is delivered to the wheel cylinders 40 provided at the two remaining wheels FR and FL.

In particular, the hydraulic pressure branching from the second hydraulic flow path 212 and delivered to the rear left wheel RL is delivered to the wheel cylinder 40 provided at the front right wheel FR through the first balance valve 241, and the hydraulic pressure branching from the second hydraulic flow path 212 and delivered to the rear right wheel RR is delivered to the wheel cylinder 40 provided at the front left wheel FL through the second balance valve 242.

At this point, the first dump valve 231 installed at the first dump flow path 116 is switched to the opened state. Therefore, as much of the oil of the reservoir 30 as an increase in volume of the first pressure chamber 112 flows into the first pressure chamber 112 to be filled therein through the first dump flow path 116 when the hydraulic piston 114 is moved forward. Also, the first inlet valve 222a and the second inlet valve 222b of the first hydraulic circuit 201 are maintained in the closed state.

Further, when the hydraulic pressure is generated in the hydraulic pressure supply device 100, the first and second cut vales 261 and 262 installed at the first and second backup flow paths 251 and 252, which are connected to the first and second hydraulic ports 24a and 24b of the master cylinder 20, are closed, and thus the hydraulic pressure discharged from the master cylinder 20 is not delivered to the wheel cylinders 40.

In addition, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at the rear end of the simulation chamber 51 is opened so that the oil filled in the simulation chamber 51 is delivered to the reservoir 30 through the simulator valve 54. Also, the reaction force piston 52 is moved, and pressure corresponding to a weight of the reaction force spring 53 supporting the reaction force piston 52 is generated inside the simulation chamber 51 to provide an appropriate pedal feeling to the driver.

Unlike FIG. 2, when the hydraulic piston 114 is reversely moved, that is, is moved backward, a braking force may also be generated through the wheel cylinders 40.

Referring to FIG. 3, when the driver steps on the brake pedal 10 at an initial stage of braking, the motor 120 is activated to rotate in a reverse direction, and a rotational force of the motor 120 is delivered to the hydraulic pressure supply unit 110 by means of the power conversion unit 130, and thus the hydraulic pressure is generated in the first pressure chamber 112 while the hydraulic piston 114 of the hydraulic pressure supply unit 110 is moved backward. The hydraulic pressure discharged from the hydraulic pressure supply unit 110 is delivered to the wheel cylinder 40 provided at each of the four wheels through the first hydraulic circuit 201 and the second hydraulic circuit 202 to generate a braking force.

In particular, the hydraulic pressure provided from the first pressure chamber 112 is directly delivered to the wheel cylinders 40 provided at the two wheels FR and FL through the first hydraulic flow path 211 connected to the first communicating hole 111a. At this point, the first and second inlet valves 221a and 221b, which are respectively installed at the two flow paths branching from the first hydraulic flow path 211, are switched to the opened state. Also, the first and second inlet valves 221a and 221b, which are respectively installed at flow paths which respectively branch off from the two flow paths branching from the second hydraulic flow path 212, and the first dump valve 231 installed at the first dump flow path 116 are maintained in the closed state to prevent the hydraulic pressure from leaking into the reservoirs 30.

Also, when the pressure delivered to the first and second hydraulic circuits 201 and 202 is measured as being higher than the target pressure value according to the pedal effort of the brake pedal 10, the first dump valve 231 may be opened to control the pressure to converge on the target pressure value.

Also, because the first balance valve 241 and the second balance valve 242 are in the opened state, the hydraulic pressure of the first hydraulic circuit 201 may be delivered to the second hydraulic circuit 202. Consequently, the hydraulic pressure is delivered to the wheel cylinders 40 provided at the two remaining wheels RR and RL.

In particular, the hydraulic pressure branching from the first hydraulic flow path 211 and delivered to the front right wheel FR is delivered to the wheel cylinder 40 provided at the rear left wheel RL through the first balance valve 241, and the hydraulic pressure branching from the first hydraulic flow path 211 and delivered to the front left wheel FL is delivered to the wheel cylinder 40 provided at the rear right wheel RR through the second balance valve 242.

At this point, the second dump valve 232 installed at the second dump flow path 117 is switched to the opened state. Therefore, as much of the oil of the reservoir 30 as an increase in volume of the second pressure chamber 113 flows into the second pressure chamber 113 to be filled therein through the second dump flow path 117 when the hydraulic piston 114 is moved backward. Also, the third inlet valve 222c and the fourth inlet valve 222d of the second hydraulic circuit 202 are maintained in the closed state.

Next, a case of releasing the braking force in the braking state established when the electric brake system 1 according to one embodiment of the present disclosure operates normally will be described.

FIGS. 4 and 5 are hydraulic circuit diagrams illustrating a state in which the electric brake system 1 according to one embodiment of the present disclosure releases braking normally, FIG. 4 is a hydraulic circuit diagram illustrating a situation in which braking pressure is released while the hydraulic piston 114 is moved backward, and FIG. 5 is a hydraulic circuit diagram illustrating a situation in which braking pressure is released while the hydraulic piston 114 is moved forward.

Referring to FIG. 4, when a pedal effort applied to the brake pedal 10 is released, the motor 120 generates a rotational force in a reverse direction compared to that of when the braking operation is performed to deliver the generated rotational force to the power conversion unit 130, and the worm shaft 131, the worm wheel 132, and the drive shaft 133 of the power conversion unit 130 are rotated in a reverse direction compared to that of when the braking operation is performed to move backward and return the hydraulic piston 114 to its original position, thereby releasing the pressure of the second pressure chamber 113 or generating a negative pressure therein. Further, the hydraulic pressure supply unit 110 receives the hydraulic pressure discharged from the wheel cylinders 40 through the first and second hydraulic circuits 201 and 202 to deliver the received hydraulic pressure to the second pressure chamber 113.

In particular, the negative pressure generated in the second pressure chamber 113 releases the pressure of the wheel cylinders 40 provided at the two wheels RR and RL through the second hydraulic flow path 212 connected to the second communicating hole 111b. At this point, the third and fourth inlet valves 221c and 221d, which are respectively installed at the two flow paths branching from the second hydraulic flow path 212, are switched to the opened state. Also, the third and fourth outlet valves 222c and 222d, which are respectively installed at flow paths which respectively branch from the two flow paths branching from the second hydraulic flow path 212, and the second dump valve 232 installed at the second dump flow path 117 are maintained in the closed state to prevent the oil of the reservoirs 30 from flowing therein.

Also, when the negative pressure delivered to the first and second hydraulic circuits 201 and 202 is measured as being higher than a target pressure releasing value according to an amount of release of the brake pedal 10, the second dump valve 232 is opened to control the negative pressure to converge on the target pressure releasing value.

In addition, because the first balance valve 241 and the second balance valve 242 are in the opened state, the negative pressure of the second hydraulic circuit 202 may be delivered to the first hydraulic circuit 201. Consequently, the pressure of the wheel cylinders 40 provided at the two remaining wheels FR and FL may be released.

In particular, the negative pressure branching from the second hydraulic flow path 212 and delivered to the rear left wheel RL is delivered to the wheel cylinder 40 provided at the front right wheel FR through the first balance valve 241, and the negative pressure branching from the second hydraulic flow path 212 and delivered to the rear right wheel RR is delivered to the wheel cylinder 40 provided at the front left wheel FL through the second balance valve 242.

At this point, the first dump valve 231 installed at the first dump flow path 116 is switched to the opened state. Therefore, as much of the oil of the first pressure chamber 112 as a decrease in volume of the first pressure chamber 112 is delivered to the reservoir 30 through the first dump flow path 116 when the hydraulic piston 114 is moved backward. Also, the first inlet valve 222a and the second inlet valve 222b of the first hydraulic circuit 201 are maintained in the closed state.

In addition, when the hydraulic pressure is generated in the hydraulic pressure supply device 100, the first and second cut vales 261 and 262 installed at the first and second backup flow paths 251 and 252, which are connected to the first and second hydraulic ports 24a and 24b of the master cylinder 20, are closed so that the negative pressure delivered to the master cylinder 20 is not delivered to the wheel cylinders 40.

Unlike FIG. 4, when the hydraulic piston 114 is moved in reverse, that is, is moved forward, the braking force of the wheel cylinder 40 may also be released.

Referring to FIG. 5, when a pedal effort applied to the brake pedal 10 is released, the motor 120 generates a rotational force in a reverse direction compared to that of when performing the braking operation to deliver the generated rotational force to the power conversion unit 130, and the worm shaft 131, the worm wheel 132, and the drive shaft 133 of the power conversion unit 130 are rotated in a reverse direction compared to that of when performing the braking operation to move the hydraulic piston 114 forward and return the hydraulic piston 114 to its original position, thereby releasing the pressure of the first pressure chamber 112 or generating a negative pressure therein. Moreover, the hydraulic pressure supply unit 110 receives the hydraulic pressure discharged from the wheel cylinders 40 through the first and second hydraulic circuits 201 and 202 to deliver the received hydraulic pressure to the first pressure chamber 112.

In particular, the negative pressure generated in the first pressure chamber 112 releases the pressure of the wheel cylinders 40 provided at the two wheels FR and FL through the first hydraulic flow path 211 connected to the first communicating hole 111a. At this point, the first and second inlet valves 221a and 221b, which are respectively installed at the two flow paths branching from the first hydraulic flow path 211, are switched to the opened state. Also, the first and second inlet valves 221a and 221b, which are respectively installed at flow paths which respectively branch off from the two flow paths branching from the first hydraulic flow path 211, and the first dump valve 231 installed at the first dump flow path 116 are maintained in the closed state to prevent the oil of the reservoirs 30 from flowing therein.

Also, when the negative pressure delivered to the first and second hydraulic circuits 201 and 202 is measured as being higher than the target pressure releasing value according to an amount of release of the brake pedal 10, the first dump valve 231 is opened to control the negative pressure to converge on the target pressure releasing value.

In addition, because the first balance valve 241 and the second balance valve 242 are in the opened state, the negative pressure of the first hydraulic circuit 201 may be delivered to the second hydraulic circuit 202. Consequently, the pressure of the wheel cylinders 40 provided at the two remaining wheels RL and RR may be released.

In particular, the negative pressure branching from the first hydraulic flow path 211 and delivered to the front right wheel FR is delivered to the wheel cylinder 40 provided at the rear left wheel RL through the first balance valve 241, and the negative pressure branching from the first hydraulic flow path 211 and delivered to the front left wheel FL is delivered to the wheel cylinder 40 provided at the rear right wheel RR through the second balance valve 242.

At this point, the second dump valve 232 installed at the second dump flow path 117 is switched to the opened state. Therefore, as much of the oil of the second pressure chamber 113 as a decrease in volume of the second pressure chamber 113 is delivered to the reservoir 30 through the second dump flow path 117 when the hydraulic piston 114 is moved forward. Also, the third inlet valve 222c and the fourth inlet valve 222d of the second hydraulic circuit 202 are maintained in the closed state.

Meanwhile, in the simulation device 50, the oil in the simulation chamber 51 is delivered to the master cylinder 20 according to the return of the reaction force piston 52 to its original position by means of the elastic force of the reaction force spring 53, and the oil is refilled in the simulation chamber 51 through the simulator valve 54 and the simulator check valve 55 which are connected to the reservoir 30 to ensure a rapid return of pressure of the pedal simulator.

Further, the electric brake system 1 according to one embodiment of the present disclosure may control the valves 221a, 221b, 221c, 221d, 222a, 222b, 222c, 222d, 241, and 242 provided at the hydraulic control unit 200 according to pressure required for the wheel cylinder 40 provided at each of the wheels RR, RL, FR, and FL of the two hydraulic circuits 201 and 202 to specify and control a control range.

FIGS. 6 and 7 are hydraulic circuit diagrams illustrating a state in which an anti-lock brake system (ABS) is operated through the electric brake system 1 according to one embodiment of the present disclosure, FIG. 6 is a hydraulic circuit diagram illustrating a situation in which the hydraulic piston 114 is moved forward and selective braking is performed, and FIG. 7 is a hydraulic circuit diagram illustrating a situation in which the hydraulic piston 114 is moved backward and selective braking is performed.

FIGS. 6 and 7 show a case of braking only a relevant wheel cylinder 40 while the ABS is operated, FIG. 6 shows a case of braking only one among the wheels, and FIG. 7 shows a state of braking only the wheels FL and FR of the first hydraulic circuit 201.

When the motor 120 is activated according to a pedal effort of the brake pedal 10, a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Referring to FIG. 6, because hydraulic pressure is generated in the second pressure chamber 113 while the hydraulic piston 114 is moved forward and the fourth inlet valve 221d is switched to the opened state, the hydraulic pressure delivered through the second hydraulic flow path 212 activates the wheel cylinder 40 located at the rear right wheel RR to generate a braking force.

At this point, the first to third inlet valves 221a, 221b, and 221c, the first to fourth outlet valves 222a, 222b, 222c, and 222d, and the second dump valve 232 are maintained in the closed state. Moreover, the second balance valve 242 is switched to the closed state so that the hydraulic pressure of the second hydraulic circuit 202 is not delivered to the first hydraulic circuit 201. Also, the first dump valve 231 is switched to the opened state so that the first pressure chamber 112 is filled with oil from the reservoir 30.

Referring to FIG. 7, because hydraulic pressure is generated in the first pressure chamber 112 while the hydraulic piston 114 is moved backward and the first and second inlet valves 221a and 221b are switched to the opened state, the hydraulic pressure delivered through the first hydraulic flow path 211 activates the wheel cylinders 40 located at the front right wheel FR and the front left wheel FL to generate a braking force.

At this point, the third and fourth inlet valves 221c and 221d, the first to fourth outlet valves 222a, 222b, 222c, and 222d, and the first dump valve 231 are maintained in the closed state. Moreover, the first and second balance valves 241 and 242 are switched to the closed state so that the hydraulic pressure of the first hydraulic circuit 201 is not delivered to the second hydraulic circuit 202. Also, the second dump valve 232 is switched to the opened state so that the second pressure chamber 113 is filled with oil from the reservoir 30.

Meanwhile, a structure for controlling the hydraulic pressure delivered to the wheel cylinders 40 through opening and closing operations of the inlet valves 221, the first and second dump valves 231 and 232, and the first and second balance valves 241 and 242 is merely one embodiment, and thus it should be understood that the embodiment of the present disclosure may include a variety of control modules capable of increasing or reducing the hydraulic pressure delivered to each of the wheels RL, RR, FL, and FR by independently opening and closing the inlet valves 221, the outlet valves 222, the first and second dump valves 231 and 232, and the first and second balance valves 241 and 242.

That is, the electric brake system 1 according to the embodiment of the present disclosure may independently control operations of the motor 120 and the respective valves 54, 221, 222, 231, 232, 241, 242, 261, and 262 to selectively deliver or discharge the hydraulic pressure to or from the wheel cylinder 40 of each of the wheels RL, RR, FL, and FR according to a required pressure such that a precise control of the hydraulic pressure may be possible.

Next, a case in which such an electric brake system 1 operates abnormally will be described.

FIG. 8 is a hydraulic circuit diagram illustrating a case in which the electric brake system 1 according to one embodiment of the present disclosure operates abnormally.

Referring to FIG. 8, when the electric brake system 1 operates abnormally, each of the valves 54, 221, 222, 231, 232, 241, 242, 261, and 262 is provided in an initial state of braking, that is, a non-operating state. When a driver pressurizes the brake pedal 10, the input rod 12 connected to the brake pedal 10 is moved forward, and the first piston 21a, which is in contact with the input rod 12, is moved forward at the same time that the second piston 22a is moved forward by means of the pressurization or movement of the first piston 21a. At this point, because there is no gap between the input rod 12 and the first piston 21a, the braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force.

At this point, the first and second cut valves 261 and 262 respectively installed at the first and second backup flow paths 251 and 252, and the first and second balance valves 241 and 242 provided at the downstream side of each of the inlet valves 221 and connecting the first hydraulic circuit 201 and the second hydraulic circuit 202 are configured with a normally opened type solenoid valve, and the simulator valve 54, the inlet valves 221, the outlet valves 222, and the first and second dump valves 231 and 232 are configured with a normally closed type solenoid valve so that the hydraulic pressure is directly delivered to the wheel cylinders 40. Therefore, braking is stably realized to improve braking safety.

FIG. 9 is a hydraulic circuit diagram illustrating a state in which the electric brake system 1 according to one embodiment of the present disclosure operates in a dump mode.

The electric brake system 1 according to one embodiment of the present disclosure may deliver braking pressure provided to relevant wheel cylinders 40 through the first to fourth outlet valves 222a, 222b, 222c, and 222d.

Referring to FIG. 9, when the first to fourth inlet valves 221a, 221b, 221c, and 221d and the first to third outlet valves 222a, 222b, and 222c are maintained in the closed state, the second balance valve 242 is switched to the closed state, and the fourth outlet valve 222d is switched to the opened state, the hydraulic pressure discharged from the wheel cylinder 40 installed at the rear right wheel RR is discharged to the reservoir 30 through the fourth outlet valve 222d.

Meanwhile, although not shown in the drawing, the fourth outlet valve 222d is opened to discharge the hydraulic pressure of the relevant wheel cylinder 40 at the same time that the first and third inlet valves 221a, 221b, and 221c are opened, and the first balance valve 241 may be opened to supply the hydraulic pressure to the three remaining wheels FR, RL, and FL.

As described above, each of the valves 221a, 221b, 221c, 221d, 222a, 222b, 222c, 222d, 241, and 242 of the hydraulic control unit 200 may be independently controlled to selectively deliver or discharge the hydraulic pressure to the wheel cylinder 40 of each of the wheels RL, RR, FL, and FR such that a precise control of the hydraulic pressure may be possible.

FIG. 10 is a hydraulic circuit diagram illustrating a non-braking state of an electric brake system 2 according to another embodiment of the present disclosure.

Comparing to the electric brake system 1 according to one embodiment of the present disclosure shown in FIG. 1, the electric brake system 2 according to another embodiment of the present disclosure shown in FIG. 10 is different in that the outlet valves 222 of FIG. 1 are not employed. It should be noted that descriptions of the remaining components is in reference to that of the electric brake system 1 according to one embodiment of the present disclosure.

FIG. 11 is a hydraulic circuit diagram illustrating a state in which the electric brake system 2 according to another embodiment of the present disclosure operates in a first dump mode.

The electric brake system 2 according to another embodiment of the present disclosure may deliver braking pressure provided to relevant wheel cylinders 40 through the first to fourth outlet valves 222a, 222b, 222c, and 222d, the first and second balance valves 241 and 242, and the first and second dump valves 231 and 232.

Referring to FIG. 11, when the first, third, and fourth inlet valves 221a, 221c, and 221d and the first dump valve 231 are maintained in the closed state, the second inlet valve 221b is switched to the opened state, and the second balance valve 242 is switched to the closed state, the hydraulic pressure in the wheel cylinder 40 installed at the front left wheel FL is discharged to the first pressure chamber 112. The reason for that is that pressure in the first pressure chamber 112 is less than that in the wheel cylinder 40. Also, the second dump valve 232 may be switched to the opened state to deliver the hydraulic pressure of the second pressure chamber 113 to the reservoir 30.

Further, the first hydraulic flow path pressure sensor PS11 installed at the first hydraulic flow path 211 may sense an amount of hydraulic pressure delivered from the wheel cylinder 40 installed at the front left wheel FL (hereinafter, simply referred to as the wheel cylinder 40). Consequently, the hydraulic pressure supply device 100 may be controlled according to an output of the first hydraulic flow path pressure sensor PS11 such that the amount of hydraulic pressure discharged from the wheel cylinder 40 may be controlled. In particular, the amount and speed of hydraulic pressure delivered from the wheel cylinder 40 may be controlled by adjusting a forward moving distance and a forward moving speed of the hydraulic piston 114.

The amount of hydraulic pressure delivered from the wheel cylinder 40 is increased when a difference between a pressure in the wheel cylinder 40 and the first pressure chamber 112 increases. As one example, when the hydraulic piston 114 is moved forward to increase a volume of the first pressure chamber 112, a larger amount of hydraulic pressure may be discharged from the wheel cylinder 40.

Meanwhile, FIG. 1 shows the first dump valve 231 as being maintained in the closed state, but the first dump valve 231 may be openable. In this case, the hydraulic pressure of the wheel cylinder 40 may be discharged to not only the first pressure chamber 112, but also to the reservoir 30 through the first dump flow path 116.

FIG. 12 is a hydraulic circuit diagram illustrating a state in which the electric brake system 2 according to another embodiment of the present disclosure operates in a second dump mode.

Referring to FIG. 12, when the first, third, and fourth inlet valves 221a, 221c, and 221d are maintained in the closed state, the second inlet valve 221b is switched to the opened state, the first dump valve 231 is switched to the opened state, and the second balance valve 242 is switched to the closed state, the hydraulic pressure in the wheel cylinder 40 installed at the front left wheel FL is delivered to the reservoir 30 through the first dump flow path 116. The reason for that is that pressure in the reservoir 30 is less than that in the wheel cylinder 40. Generally, the pressure in the reservoir 30 is provided as atmospheric pressure.

Meanwhile, because the pressure in the wheel cylinder 40 is considerably higher than atmospheric pressure, the hydraulic pressure of the wheel cylinder 40 may be rapidly discharged to the reservoir 30 when the first dump valve 231 is opened.

Comparing the first dump mode shown in FIG. 11 with the second dump mode shown in FIG. 12, the first dump mode may be used to control discharging of the hydraulic pressure of the wheel cylinder 40, whereas the second dump mode may be used to rapidly discharge the hydraulic pressure of the wheel cylinder 40.

FIG. 13 is a hydraulic circuit diagram illustrating a non-braking state of an electric brake system 3 according to another embodiment of the present disclosure.

Comparing to the electric brake system 1 according to one embodiment of the present disclosure shown in FIG. 1, the electric brake system 3 according to another embodiment of the present disclosure shown in FIG. 13 is different in that the second and third outlet valves 222b and 222c of FIG. 1 are not employed. It should be noted that descriptions of the remaining components is in reference to that of the electric brake system 1 according to one embodiment of the present disclosure.

FIGS. 14 to 16 are hydraulic circuit diagrams illustrating a state in which the electric brake system 3 according to still another embodiment of the present disclosure operates in a dump mode.

The electric brake system 3 according to still another embodiment of the present disclosure may discharge braking pressure provided to relevant wheel cylinders 40 through the first and fourth outlet valves 222a and 222d.

FIG. 14 shows a state in which the hydraulic pressure of the wheel cylinders 40 connected to the outlet valves 222a and 222d is discharged.

Referring to FIG. 14, when the first to fourth inlet valves 221a, 221b, 221c, and 221d and the first to third outlet valves 222a, 222b, and 222c are maintained in the closed state, the second balance valve 242 is switched to the closed state, and the fourth outlet valve 222d is switched to the opened state, the hydraulic pressure in the wheel cylinder 40 installed at the rear right wheel RR is discharged to the reservoir 30 through the fourth outlet valve 222d.

Meanwhile, although not shown in the drawing, the fourth outlet valve 222d may be opened to deliver the hydraulic pressure of the relevant wheel cylinder 40, and at the same time the first and third inlet valves 221a, 221b, and 221c may be opened and the first balance valve 241 may be opened to supply the hydraulic pressure to the three remaining wheels FR, RL, and FL.

As described above, each of the valves 221a, 221b, 221c, 221d, 222a, 222b, 222c, 222d, 241, and 242 of the hydraulic control unit 200 may be independently controlled to selectively deliver or discharge the hydraulic pressure to the wheel cylinder 40 of each of the wheels RL, RR, FL, and FR such that a precise control of the hydraulic pressure may be possible.

The electric brake system 3 according to another embodiment of the present disclosure may discharge braking pressure provided to the relevant wheel cylinders 40 through the first to fourth outlet valves 222a, 222b, 222c, and 222d, the first and second balance valves 241 and 242, and the first and second dump valves 231 and 232.

FIGS. 15 and 16 show a state in which hydraulic pressure of the wheel cylinders 40 not connected to the outlet valves is discharged.

Referring to FIG. 15, when the first, third, and fourth inlet valves 221a, 221c, and 221d and the first dump valve 231 are maintained in the closed state, the second inlet valve 221b is switched to the opened state, and the second balance valve 242 is switched to the closed state, the hydraulic pressure in the wheel cylinder 40 installed at the front left wheel FL is discharged to the first pressure chamber 112. Also, the second dump valve 232 may be switched to the opened state to deliver the hydraulic pressure of the second pressure chamber 113 to the reservoir 30.

Referring to FIG. 16, when the first, third, and fourth inlet valves 221a, 221c, and 221d are maintained in the closed state, the second inlet valve 221b is switched to the opened state, the first dump valve 231 is switched to the opened state, and the second balance valve 242 is switched to the closed state, the hydraulic pressure in the wheel cylinder 40 installed at the front left wheel FL is discharged to the reservoir 30 through the first dump flow path 116.

As should be apparent from the above description, the electric brake system according to the embodiments of the present disclosure is capable of more rapidly providing hydraulic pressure and more accurately controlling an increase in pressure by configuring a piston of a hydraulic pressure supply device with double action.

Also, a valve is provided at each of hydraulic circuits so that pressure of cylinders may be independently controlled.

DESCRIPTION OF REFERENCE NUMERALS

| | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 221: Inlet Valve |
| 222: Outlet Valve | 231: First Dump Valve |
| 232: Second Dump Valve | 233: Release Valve |
| 241: First Balance Valve | 242: Second Balance Valve |
| 251: First Backup Flow Path | 252: Second Backup Flow Path |
| 261: First Cut Valve | 262: Second Cut Valve |

What is claimed is:
1. An electric brake system comprising:
a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders;
a first hydraulic circuit including a first hydraulic flow path communicating with the first pressure chamber, and first and second branching flow paths that branch from the first hydraulic flow path to be connected to two wheel cylinders, respectively;
a second hydraulic circuit including a second hydraulic flow path communicating with the second pressure chamber, and third and fourth branching flow paths that branch from the second hydraulic flow path to be connected to two wheel cylinders, respectively;
first to fourth inlet valves configured to control an opening and closing of the first to fourth branching flow paths, respectively;

a balance valve configured to control an opening and closing of a balance flow path connecting the first hydraulic circuit to the second hydraulic circuit;

a first balance valve configured to control an opening and closing of a first balance flow path connecting the first branching flow path of the first hydraulic circuit to the third branching flow path of the second hydraulic circuit; and a second balance valve configured to control an opening and closing of a second balance flow path connecting the second branching flow path of the first hydraulic circuit to the fourth branching flow path of the second hydraulic circuit.

2. The electric brake system of claim 1, wherein the hydraulic pressure supply device includes:

the cylinder block;

the piston movably accommodated inside the cylinder block and configured to perform a reciprocal movement by means of a rotational force of a motor;

the first pressure chamber comparted by means of the one side of the piston and the cylinder block, and configured to communicate with the first hydraulic circuit connected to the two wheel cylinders; and the second pressure chamber comparted by means of the other side of the piston and the cylinder block, and configured to communicate with the second hydraulic circuit connected to the two wheel cylinders.

3. The electric brake system of claim 1, further comprising:

a first dump valve installed at a first dump flow path that branches from the first hydraulic flow path and connects a reservoir storing oil therein to the first pressure chamber; and a second dump valve installed at a second dump flow path that branches from the second hydraulic flow path and connects the reservoir to the second pressure chamber.

4. The electric brake system of claim 3, wherein the first dump valve controls an opening and closing of the first dump flow path, and the second dump valve controls an opening and closing of the second dump flow path.

5. The electric brake system of claim 3, wherein the first dump flow path branches from the first hydraulic flow path, and the second dump flow path branches from the second hydraulic flow path.

6. The electric brake system of claim 5, wherein each of the first dump valve and the second dump valve is a normally closed type valve that is usually closed and is opened when an opening signal is received.

7. The electric brake system of claim 1, wherein the first balance flow path and the second balance flow path are provided at a downstream side of the first to fourth inlet valves.

8. The electric brake system of claim 1, further comprising:

outlet valves configured to control an opening and closing of a flow path that branches from one or more branching flow paths among the first to fourth branching flow paths to be connected to a reservoir storing oil therein.

9. The electric brake system of claim 8, wherein the outlet valves are normally closed type valves that are usually closed and are opened when an opening signal is received.

10. The electric brake system of claim 8, wherein the outlet valves include:

first to fourth outlet valves configured to respectively control an opening and closing of a flow path that branches from each of the first to fourth branching flow paths to be connected to the reservoir.

11. An electric brake system comprising:

a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders;

a first hydraulic circuit configured to include a first hydraulic flow path connecting the first pressure chamber to the one or more of wheel cylinders;

a second hydraulic circuit configured to include a second hydraulic flow path connecting the second pressure chamber to the one or more of wheel cylinders;

a first dump valve installed at a first dump flow path branching from the first hydraulic flow path and connecting a reservoir for storing oil therein to the first pressure chamber;

a second dump valve installed at a second dump flow path branching from the second hydraulic flow path and connecting the reservoir to the second pressure chamber;

a plurality of inlet valves configured to independently control an opening and closing of each of the first and second hydraulic flow paths;

an electronic control unit (ECU) configured to control an operation of a motor and an opening and closing of each of the valves, and execute a dump mode that discharges hydraulic pressure of a single wheel cylinder among the one or more wheel cylinders;

a balance valve configured to control an opening and closing of a balance flow path connecting the first hydraulic circuit to the second hydraulic circuit;

a master cylinder for generating hydraulic pressure by a pedal effort of the brake pedal; and a backup flow path capable of directly supplying oil discharged from the master cylinder to the wheel cylinders when the hydraulic pressure supply device operates abnormally, wherein the backup flow path is connected to the balance flow path.

12. The electric brake system of claim 11, wherein the dump mode includes:

a first dump mode which opens inlet valves connected to the one or more wheel cylinders among the plurality of inlet valves, and opens the first dump valve or the second dump valve which is connected to the opened inlet valves to discharge hydraulic pressure of the one or more wheel cylinders to the reservoir.

13. The electric brake system of claim 11, wherein the dump mode includes:

a second dump mode which opens inlet valves connected to the one or more wheel cylinders among the plurality of inlet valves, and moves the piston in a direction which increases a volume of the first pressure chamber or the second pressure chamber, which is connected to the one or more wheel cylinders to discharge hydraulic pressure of the one or more wheel cylinders to the first pressure chamber or the second pressure chamber.

14. The electric brake system of claim 11, wherein the dump mode includes:

a third dump mode which opens inlet valves connected to the one or more wheel cylinders among the plurality of inlet valves to discharge hydraulic pressure of the one or more wheel cylinders to the reservoir.

15. The electric brake system of claim 11, further comprising:
a first balance valve configured to control an opening and closing of a first balance flow path connecting the first branching flow path of the first hydraulic circuit to the third branching flow path of the second hydraulic circuit; and
a second balance valve configured to control an opening and closing of a second balance flow path connecting the second branching flow path of the first hydraulic circuit to the fourth branching flow path of the second hydraulic circuit.

16. The electric brake system of claim 15, wherein the first balance flow path and the second balance flow path are provided at a downstream side of the first to fourth inlet valves.

17. An electric brake system comprising:
a hydraulic pressure supply device configured to generate hydraulic pressure using a piston that is activated by means of an electrical signal output corresponding to a displacement of a brake pedal, and including a first pressure chamber provided at one side of the piston, which is movably accommodated inside a cylinder block, and connected to one or more wheel cylinders, and a second pressure chamber provided at the other side of the piston and connected to one or more wheel cylinders;
a first hydraulic circuit configured to include a first hydraulic flow path connecting the first pressure chamber to the one or more of wheel cylinders;
a second hydraulic circuit configured to include a second hydraulic flow path connecting the second pressure chamber to the one or more of wheel cylinders;
a first dump valve installed at a first dump flow path branching from the first hydraulic flow path and connecting a reservoir for storing oil therein to the first pressure chamber;
a second dump valve installed at a second dump flow path branching from the second hydraulic flow path and connecting the reservoir to the second pressure chamber;
a plurality of inlet valves configured to independently control an opening and closing of each of the first and second hydraulic flow paths;
an electronic control unit (ECU) configured to control an operation of a motor and an opening and closing of each of the valves, and execute a dump mode that discharges hydraulic pressure of a single wheel cylinder among the one or more wheel cylinders;
a balance valve configured to control an opening and closing of a balance flow path connecting the first hydraulic circuit to the second hydraulic circuit; and
a master cylinder for generating hydraulic pressure by a pedal effort of the brake pedal and include two chambers,
wherein the electronic control unit (ECU) executes a backup mode that directly supplies oil discharged from the master cylinder to the wheel cylinders when the hydraulic pressure supply device operates abnormally, and
in the backup mode, one of the chamber of the master cylinder supplies oil to the first hydraulic circuit, and the other chamber of the master cylinder supplies oil to the second hydraulic circuit.

* * * * *